US010423913B2

(12) United States Patent
Rosenfeld

(10) Patent No.: US 10,423,913 B2
(45) Date of Patent: Sep. 24, 2019

(54) SYSTEM AND METHOD FOR PROCESS-BASED ANALYSIS

(71) Applicant: The Boeing Company, Chicago, IL (US)

(72) Inventor: Yechiel Rosenfeld, Beverly Hills, CA (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 14/625,678

(22) Filed: Feb. 19, 2015

(65) Prior Publication Data

US 2016/0247104 A1    Aug. 25, 2016

(51) Int. Cl.
*G06Q 10/00* (2012.01)
*G06Q 10/06* (2012.01)

(52) U.S. Cl.
CPC ..... *G06Q 10/0635* (2013.01); *G06Q 10/0633* (2013.01)

(58) Field of Classification Search
CPC ............. G06Q 10/0635; G06Q 10/0633
USPC ............................................... 705/7.27
See application file for complete search history.

(56) References Cited

U.S. PATENT DOCUMENTS

| 8,050,993 | B2 | 11/2011 | Del Bianco et al. |
| 2010/0228681 | A1* | 9/2010 | Del Bianco ............ G06Q 10/06 705/348 |
| 2012/0004946 | A1* | 1/2012 | Blackwood ........ G06Q 10/0635 705/7.28 |
| 2014/0324519 | A1* | 10/2014 | Dennis ............... G06Q 10/0635 705/7.28 |
| 2015/0170087 | A1* | 6/2015 | Johnston .......... G06Q 10/06316 705/7.26 |

OTHER PUBLICATIONS

Subburaman, Karthik, "A Modified FMEA Approach to Enhance Reliability of Lean Systems. " Master's Thesis, University of Tennessee, 2010.*
Oddy, "Getting Ready for ISO-9001:2015," *Quality Digest* (www.qualitydigest.com) (2014).

* cited by examiner

*Primary Examiner* — William S Brockington, III
*Assistant Examiner* — Hector Leal
(74) *Attorney, Agent, or Firm* — Walters & Wasylyna LLC

(57) ABSTRACT

A method for process-based analysis may include the steps of: (1) defining a process, the process including a set of steps, (2) identifying risks and/or issues associated the process and/or peripheral symbiotic essentials, a risk and/or issue being associated with a step of the set of steps, (3) assessing the risk and/or the issue based on at least one attribute of the risk and/or the issue, and (4) prioritizing the risks and/or the issues for disposition.

27 Claims, 22 Drawing Sheets

FIG. 5A

RAPP TOOL 246

| STEP NUMBER 252 | STEP 206 | CONCERN 256 | ISSUE 238 | EVENT 254 | RISK 234 | SEVERITY 258 | OCCURRENCE 262 | DETECTION 264 | BIM 260 | DISPOSITIONING ACTION 236 |
|---|---|---|---|---|---|---|---|---|---|---|
| 1 | STEP 206a | CONCERN 256a | ISSUE 238a | EVENT 254a | RISK 234a | SEVERITY SCORE 296 | OCCURRENCE SCORE 298 | DETECTION SCORE 300 | BIM SCORE 302 | DISPOSITIONING ACTION 236a |
| 2 | STEP 206b | CONCERN 256b | ISSUE 238b | EVENT 254b | RISK 234b | SEVERITY SCORE 296 | OCCURRENCE SCORE 298 | DETECTION SCORE 300 | BIM SCORE 302 | DISPOSITIONING ACTION 236b |
| 3 | STEP 206c | CONCERN 256c | ISSUE 238c | EVENT 254c | RISK 234c | SEVERITY SCORE 296 | OCCURRENCE SCORE 298 | DETECTION SCORE 300 | BIM SCORE 302 | DISPOSITIONING ACTION 236c |
| 4 | STEP 206d | CONCERN 256d | ISSUE 238d | EVENT 254d | RISK 234d | SEVERITY SCORE 296 | OCCURRENCE SCORE 298 | DETECTION SCORE 300 | BIM SCORE 302 | DISPOSITIONING ACTION 236d |
| 5 | STEP 206e | CONCERN 256e | ISSUE 238e | EVENT 254e | RISK 234e | SEVERITY SCORE 296 | OCCURRENCE SCORE 298 | DETECTION SCORE 300 | BIM SCORE 302 | DISPOSITIONING ACTION 236e |
| . . . | . . . | . . . | . . . | . . . | . . . | . . . | . . . | . . . | . . . | . . . |
| n | STEP 206n | CONCERN 256n | ISSUE 238n | EVENT 254n | RISK 234n | SEVERITY SCORE 296 | OCCURRENCE SCORE 298 | DETECTION SCORE 300 | BIM SCORE 302 | DISPOSITIONING ACTION 236n | continued to FIG. 5B

| SCHEDULE 282 | OWNERSHIP 284 | MITIGATED SEVERITY 290 | RAPP TOOL 246 MITIGATED OCCURRENCE 292 | MITIGATED DETECTION 294 | MITIGATED BIM 288 | IMPROVEMENT 312 |
|---|---|---|---|---|---|---|
| DATE 286 | MEMBER 226 | MITIGATED SEVERITY SCORE 304 | MITIGATED OCCURRENCE SCORE 306 | MITIGATED DETECTION SCORE 308 | MITIGATED BIM SCORE 310 | FACTOR 314 |
| DATE 286 | MEMBER 226 | MITIGATED SEVERITY SCORE 304 | MITIGATED OCCURRENCE SCORE 306 | MITIGATED DETECTION SCORE 308 | MITIGATED BIM SCORE 310 | FACTOR 314 |
| DATE 286 | MEMBER 226 | MITIGATED SEVERITY SCORE 304 | MITIGATED OCCURRENCE SCORE 306 | MITIGATED DETECTION SCORE 308 | MITIGATED BIM SCORE 310 | FACTOR 314 |
| DATE 286 | MEMBER 226 | MITIGATED SEVERITY SCORE 304 | MITIGATED OCCURRENCE SCORE 306 | MITIGATED DETECTION SCORE 308 | MITIGATED BIM SCORE 310 | FACTOR 314 |
| DATE 286 | MEMBER 226 | MITIGATED SEVERITY SCORE 304 | MITIGATED OCCURRENCE SCORE 306 | MITIGATED DETECTION SCORE 308 | MITIGATED BIM SCORE 310 | FACTOR 314 |
| ... | ... | ... | ... | ... | ... | ... |
| DATE 286 | MEMBER 226 | MITIGATED SEVERITY SCORE 304 | MITIGATED OCCURRENCE SCORE 306 | MITIGATED DETECTION SCORE 308 | MITIGATED BIM SCORE 310 | FACTOR 314 |

FIG. 5B

| NUMERICAL VALUE 268 | SEVERITY 258 |
|---|---|
| 1 | CUSTOMER/ARTICLE WILL NOT NOTICE THE ISSUE / ADVERSE EFFECT, OR IT IS INSIGNIFICANT |
| 2 | CUSTOMERS WILL PROBABLY EXPERIENCE SLIGHT ANNOYANCE |
| 3 | CUSTOMER WILL EXPERIENCE ANNOYANCE DUE TO THE ISSUE / SLIGHT DEGRADATION OF PERFORMANCE |
| 4 | CUSTOMER DISSATISFACTION DUE TO THE ISSUE / REDUCED PERFORMANCE |
| 5 | CUSTOMER IS MADE UNCOMFORTABLE OR THEIR PRODUCTIVITY IS REDUCED BY THE CONTINUED DEGRADATION CAUSED BY THE ISSUE |
| 6 | WARRANTY REPAIR OR SIGNIFICANT MANUFACTURING OR ASSEMBLY COMPLAINT DUE TO THE ISSUE |
| 7 | HIGH DEGREE OF CUSTOMER DISSATISFACTION DUE TO COMPONENT ISSUE WITHOUT COMPLETE LOSS OF FUNCTION. PRODUCTIVITY IMPACTED BY HIGH SCRAP OR NETWORK LEVELS |
| 8 | VERY HIGH DEGREE OF DISSATISFACTION DUE TO THE LOSS OF FUNCTION WITHOUT A NEGATIVE IMPACT ON SAFETY OR GOVERNMENTAL REGULATIONS |
| 9 | CUSTOMER ENDANGERED DUE TO THE ADVERSE IMPACT OF THE ISSUE ON SAFE SYSTEM PERFORMANCE WITH WARNING BEFORE ISSUE OR VIOLATION OF GOVERNMENTAL REGULATIONS |
| 10 | CUSTOMER ENDANGERED DUE TO THE ADVERSE EFFECT OF THE ISSUE ON SAFE SYSTEM PERFORMANCE WITHOUT WARNING BEFORE ISSUE OR VIOLATION OF GOVERNMENTAL REGULATIONS |

FIG. 8A

| OCCURRENCE 262 | DETECTION 264 |
|---|---|
| LIKELIHOOD OF OCCURRENCE IS REMOTE | SURE THAT THE POTENTIAL ISSUE WILL BE FOUND OR PREVENTED BEFORE REACHING THE NEXT CUSTOMER |
| LOW ISSUE OCCURRENCE RATE WITH SUPPORTING DOCUMENTATION | ALMOST CERTAIN THAT THE POTENTIAL ISSUE WILL BE FOUND OR PREVENTED BEFORE REACHING THE NEXT CUSTOMER |
| LOW ISSUE OCCURRENCE RATE WITHOUT SUPPORTING DOCUMENTATION | LOW LIKELIHOOD THAT THE POTENTIAL ISSUE WILL REACH THE NEXT CUSTOMER UNDETECTED |
| OCCASIONAL ISSUE OCCURRENCES | CONTROLS MAY DETECT OR PREVENT THE POTENTIAL ISSUE FROM REACHING THE NEXT CUSTOMER |
| RELATIVELY MODERATE ISSUE OCCURRENCE RATE WITH SUPPORTING DOCUMENTATION | MODERATE LIKELIHOOD THAT THE POTENTIAL ISSUE WILL REACH THE NEXT CUSTOMER |
| MODERATE ISSUE OCCURRENCE RATE WITHOUT SUPPORTING DOCUMENTATION | CONTROLS ARE UNLIKELY TO DETECT OR PREVENT THE POTENTIAL ISSUE FROM REACHING THE NEXT CUSTOMER |
| RELATIVELY HIGH ISSUE OCCURRENCE RATE WITH SUPPORTING DOCUMENTATION | POOR LIKELIHOOD THAT THE POTENTIAL ISSUE WILL BE DETECTED OR PREVENTED BEFORE REACHING THE NEXT CUSTOMER |
| HIGH ISSUE OCCURRENCE RATE WITHOUT SUPPORTING DOCUMENTATION | VERY POOR LIKELIHOOD THAT THE POTENTIAL ISSUE WILL BE DETECTED OR PREVENTED BEFORE REACHING THE NEXT CUSTOMER |
| ISSUE OCCURRENCE IS ALMOST CERTAIN BASED ON WARRANTY DATA OR TESTING | CURRENT CONTROLS PROBABLY WILL NOT EVEN DETECT THE RISK AND PROBABLY NOT PREVENT THE POTENTIAL ISSUE |
| ASSURED OF ISSUE OCCURRENCE BASED ON WARRANTY DATA OR TESTING | ABSOLUTE CERTAINTY THAT THE CURRENT CONTROLS WILL NOT DETECT THE RISK OR PREVENT THE POTENTIAL ISSUE |

FIG. 8B

| STEP NUMBER 252 | STEP 206 | ... | RISK 234 | ... | RAPP TOOL 246 | | | | | BIM 260 | | | |
|---|---|---|---|---|---|---|---|---|---|---|---|---|---|
| | | | | | TECHNICAL SEVERITY 316 | SCHEDULE SEVERITY 318 | COST SEVERITY 320 | OCCURRENCE 262 | DETECTION 264 | | | | |
| 1 | STEP 206a | ... | RISK 234a | ... | TECHNICAL SEVERITY SCORE 322 | SCHEDULE SEVERITY SCORE 324 | COST SEVERITY SCORE 326 | OCCURRENCE SCORE 298 | DETECTION SCORE 300 | BIM SCORE 302a | BIM SCORE 302b | BIM SCORE 302c | BIM SCORE 302d | ... |
| 2 | STEP 206b | ... | RISK 234b | ... | TECHNICAL SEVERITY SCORE 322 | SCHEDULE SEVERITY SCORE 324 | COST SEVERITY SCORE 326 | OCCURRENCE SCORE 298 | DETECTION SCORE 300 | BIM SCORE 302a | BIM SCORE 302b | BIM SCORE 302c | BIM SCORE 302d | ... |
| 3 | STEP 206c | ... | RISK 234c | ... | TECHNICAL SEVERITY SCORE 322 | SCHEDULE SEVERITY SCORE 324 | COST SEVERITY SCORE 326 | OCCURRENCE SCORE 298 | DETECTION SCORE 300 | BIM SCORE 302a | BIM SCORE 302b | BIM SCORE 302c | BIM SCORE 302d | ... |
| 4 | STEP 206d | ... | RISK 234d | ... | TECHNICAL SEVERITY SCORE 322 | SCHEDULE SEVERITY SCORE 324 | COST SEVERITY SCORE 326 | OCCURRENCE SCORE 298 | DETECTION SCORE 300 | BIM SCORE 302a | BIM SCORE 302b | BIM SCORE 302c | BIM SCORE 302d | ... |
| 5 | STEP 206e | ... | RISK 234e | ... | TECHNICAL SEVERITY SCORE 322 | SCHEDULE SEVERITY SCORE 324 | COST SEVERITY SCORE 326 | OCCURRENCE SCORE 298 | DETECTION SCORE 300 | BIM SCORE 302a | BIM SCORE 302b | BIM SCORE 302c | BIM SCORE 302d | ... |
| ... | ... | ... | ... | ... | ... | ... | ... | ... | ... | ... | ... | ... | ... | ... |
| n | STEP 206n | ... | RISK 234n | ... | TECHNICAL SEVERITY SCORE 322 | SCHEDULE SEVERITY SCORE 324 | COST SEVERITY SCORE 326 | OCCURRENCE SCORE 298 | DETECTION SCORE 300 | BIM SCORE 302a | BIM SCORE 302b | BIM SCORE 302c | BIM SCORE 302d | ... |

FIG. 15

SYSTEM AND METHOD FOR PROCESS-BASED ANALYSIS

FIELD

The present disclosure is generally related to risk analysis and, more particularly, to systems and methods for identifying, assessing, presenting, reporting, dispositioning and mitigating risks associated with a process and its symbiotic periphery.

BACKGROUND

An issue is any negative unexpected consequence of a business practice, behavior or action. Many business processes are frequently plagued by issues, which often result in personal injury, damage to product and equipment, high costs, schedule impacts and harm to reputation and credibility. State-of-the-art issue resolution often involves an investigation into direct and root causality, often designated as Root Cause and Corrective Action ("RCCA"). By definition, RCCA is reactive, i.e., something has to go awry before action is taken. By the time RCCA is invoked, the damage has been done and costs have been incurred. Undesirably, such reactive processes are inaccurate and highly effort consuming. In order to reduce the impact of such reactive approaches, the number of unexpected events needs to be reduced.

Business value-added activities are driven by processes. All processes are designed to generate at least one deliverable or output (e.g., a tactile product, maintenance process, etc.), which is directed to a customer or customers. To create the deliverable, the process requires inputs such as energy, raw materials, labor, information, etc. These inputs are provided by suppliers. As is known in the art, the symbiotic Supplier-Input-Process-Output-Customer ("SIPOC") relationship is illustrated in FIG. 21.

All issues occur either within the process or at its essential periphery. For example, issues may impact the customers, the output deliverables, the process, its inputs or the input suppliers. Data indicates that issues are merely a manifestation of risk, which is present in the process and its periphery for some time before the issue appears. Therefore, if the risk is identified and dispositioned appropriately, the issue, and its collateral damage, will have been prevented.

Accordingly, those skilled in the art continue with research and development efforts in the field of risk analysis and management.

SUMMARY

In one embodiment, the disclosed method for process-based analysis may include the steps of: (1) defining a process, the process including a set of steps, (2) identifying risks associated the process, a risk being associated with a step of the set of steps, (3) assessing the risk based on at least one attribute of the risk, and (4) prioritizing the risks for disposition.

In another embodiment, the disclosed apparatus may include a process definition module configured to identify a set of steps of a process, an identification module configured to identify risks and issues associated with each step of the set of steps, an assessment module configured to quantify the risks based on at least one attribute of a risk and the issues based on at least one attribute of an issue, and a prioritization module configured to prioritize the risks and the issues.

In yet another embodiment, disclosed is a non-transitory computer-readable storage medium containing instructions, that when executed by a processor, controls a computer system to be configured for: (1) defining a process, the process comprising a set of steps, (2) identifying risks and issues associated the process, one of a risk or an issue being associated with a step of the set of steps, (3) assessing one of the risk or the issue based on at least one attribute, and (4) prioritizing the risks and the issues for disposition.

Other embodiments of the disclosed apparatus and method will become apparent from the following detailed description, the accompanying drawings and the appended claims.

BRIEF DESCRIPTION OF THE DRAWINGS

FIG. 5A is a first portion of an illustration of one example of a Risk Assessment Process and Presentation ("RAPP") Tool;

FIG. 5B is second portion of the illustration of the Risk Assessment Process and Presentation Tool;

FIG. 8A is first portion of an illustration of one example of a quantification scale;

FIG. 8B is a second portion of the illustration of the quantification scale;

FIG. 15 is an illustration of another example of the Risk Assessment Process and Presentation Tool;

DETAILED DESCRIPTION

Figure 1:
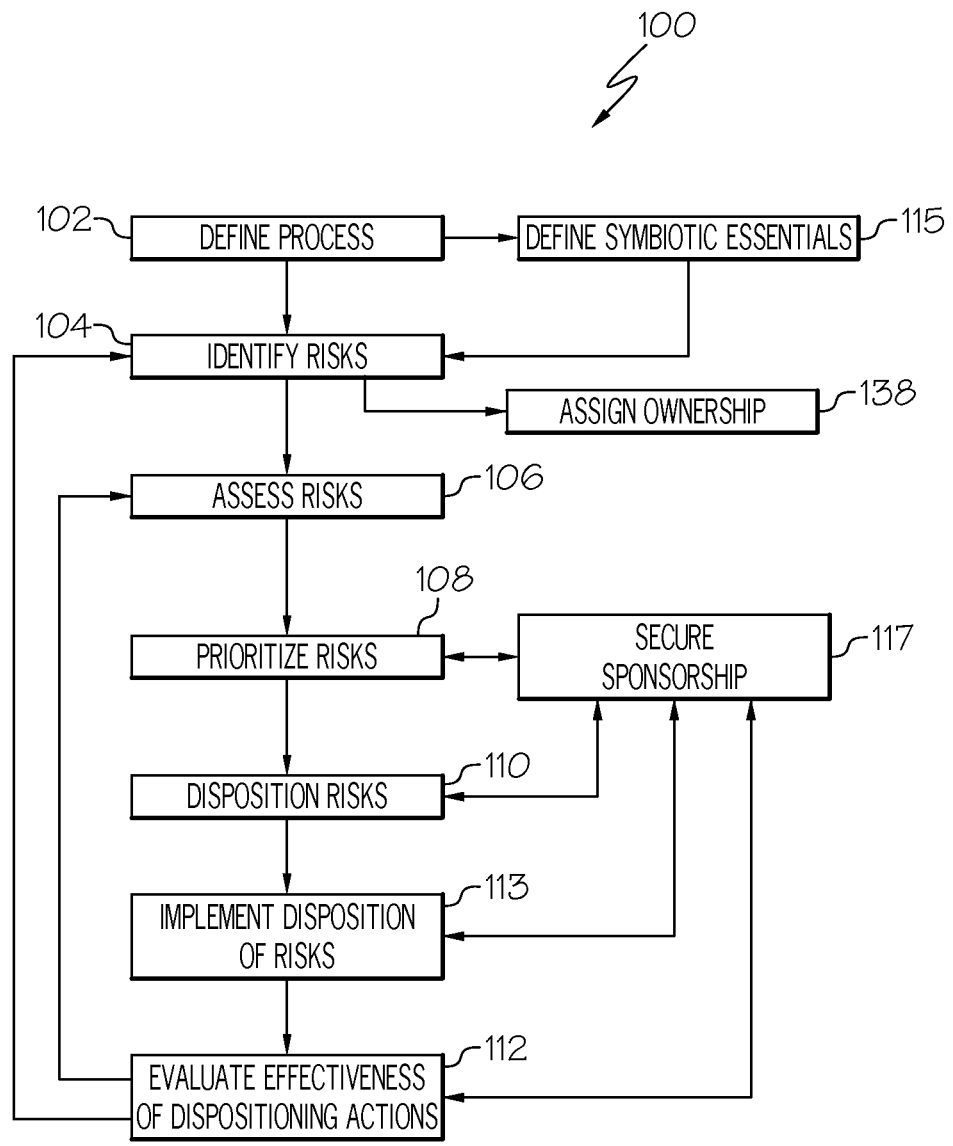
FIG. 1 is a flow diagram of one embodiment of the disclosed method for process-based analysis.

The following detailed description refers to the accompanying drawings, which illustrate specific embodiments of the disclosure. Other embodiments having different structures and operations do not depart from the scope of the present disclosure. Like reference numerals may refer to the same or similar elements or components in the different drawings.

The present disclosure recognizes and takes into account that substantially every unexpected event and nonconforming resulting outcome may be a manifestation or realization of one or more risks that exist in a process. Further, the present disclosure recognizes and takes into account that identification and disposition of risk may reduce the count of unexpected events and/or the magnitude of resulting outcomes (e.g., the effect on a process). Moreover, the present disclosure recognizes and takes into account that risks that manifest into unexpected events may be rooted within or adjacent to the steps and appropriate presence of elements that make up the process, therefore, risk disposition should be process-based.

The present disclosure further recognizes and takes into account that industry has demonstrated an immediate need for issue remedial action that is proactive, rather than reactive. Such proactive methodology may be based on a skill set and tools to define the process and its essential periphery in a manner that may promote diligent risk identification, assess a business impact measure of the risk, present it graphically in multiple iconic formats, and affect the appropriate dispositioning and mitigation where required.

Embodiments of the present disclosure may provide for a process-based methodology for identifying and assessing (e.g., quantifying) risks in a risk analysis and management process. The methodology provided in the present disclosure may improve on traditionally used qualitative risk analysis by providing greater accuracy in risks comparison and impact, thereby helping to identify risks to be prioritized to receive the greatest disposition efforts.

Specifically, the process-based risk analysis methodology disclosed herein provides for risks comparison and impact calculated on three dimensions of risk associated with each individual step of the process. The use of such a method makes a risk prioritization process more efficient, thereby helping managers and/or other personnel involved in a risk management process to focus their efforts on the most critical risks for success of the process and deliver the maximum business value.

Embodiments of the present disclosure may establish a relationship between the issues that impact a process and the risks that precede the issues. Therefore, identifying and dispositioning (e.g., mitigating) the risks may prevent the issue or measurably lessen an impact of the issue on the process.

As used herein, the term "risk" refers to any situation or circumstance with a potential (e.g., a realistic likelihood) of occurring and an unfavorable consequence should it occur, which could result in a loss or an unfavorable impact on the technical, schedule or cost performance of the process. In other words, risk may be any potential of a negative business impact resulting from something going wrong with a task, action, element and/or part of the process.

Risk may be expressed in terms of likelihood and consequence (e.g., outcome). As one example, risk may include a trigger, a probability and an impact. The trigger may be an unexpected event (e.g., an unwanted change in the process, symbiotic essentials and/or environment). The probability may be a measure of the likelihood that the unexpected event will occur. The impact may be a measure of the severity of the unexpected event (e.g., the issue). Thus, when risk is realized, it becomes an issue.

As used herein, the term "issue" refers to any situation or circumstance that is occurring or has occurred and that has an unfavorable consequence impacting the technical, schedule or cost performance of the process. In other words, an issue may be any problem, non-conformance or unexpected event that causes injury to personnel, harm to process execution, non-conformities or damage to manufactured products (e.g., hardware, software, etc.), and/or loss of profits. Thus, an issue is a realization of undispositioned (e.g., unmitigated) risk.

Figure 2:
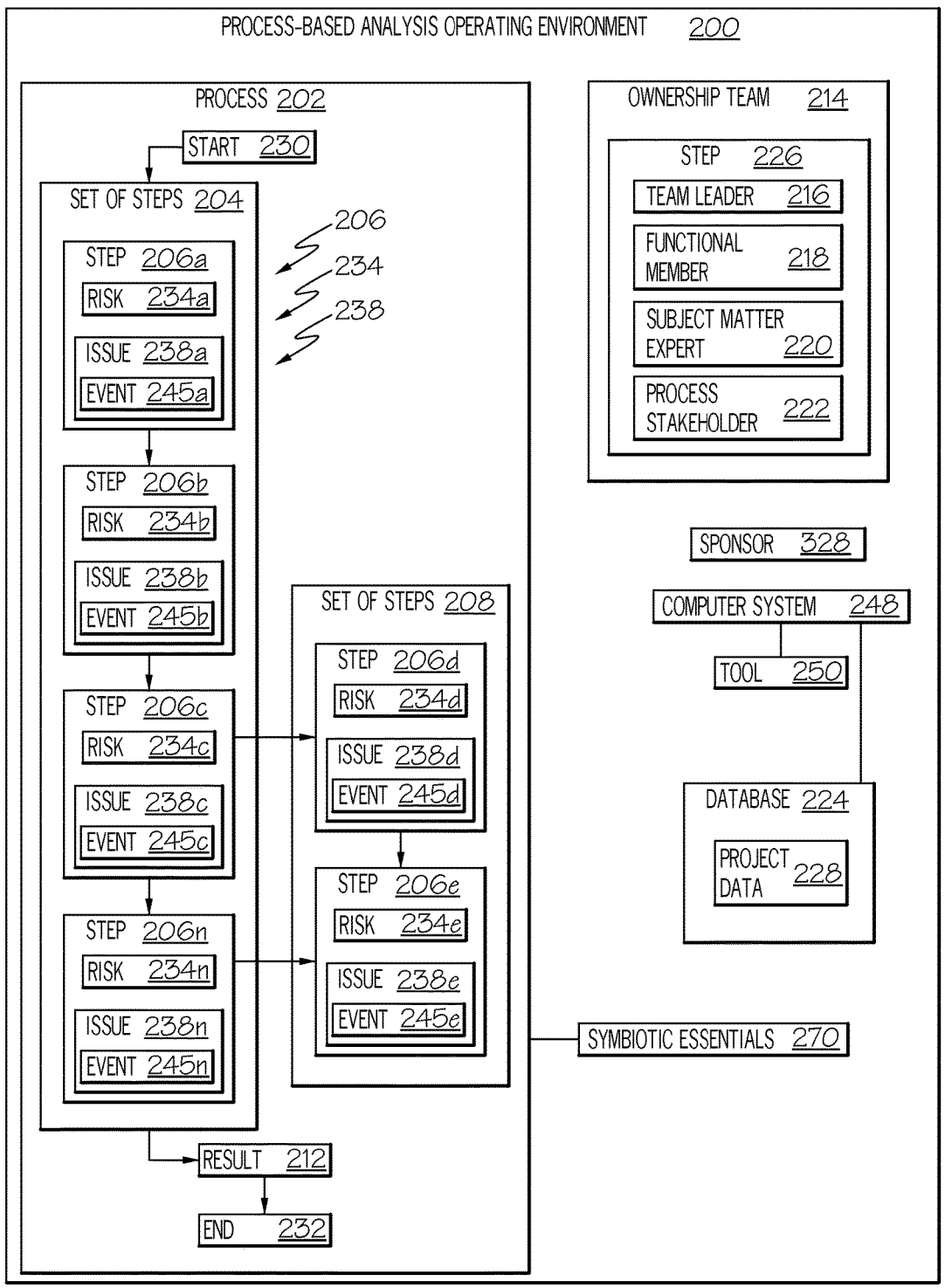
FIG. 2 is a schematic block diagram of one embodiment of a process-based analysis operating environment.

Referring to FIG. 1, and with reference to FIG. 2, disclosed is one embodiment of method, generally designated 100, for process-based analysis, for example, of issues and/or risks associated with a process. FIG. 2 illustrates one embodiment of process-based analysis environment 200 that may be utilized during implementation of method 100. The execution of method 100 (FIG. 1) may minimize the probability of the occurrence and/or the severity of the consequences of issues 238 (e.g., events 254 adverse to process 202) realized from risks 234 associated with process 202.

Method 100 may include defining process 202, as shown at block 102. Method 100 may further include identifying risks 234 associated with process 202, as shown at block 104. Method 100 may further include assessing the identified risks 234, as shown at block 106. Method 100 may further include defining symbiotic essentials 270, as shown at block 115. Method 100 may further include prioritizing the assessed risks 234, as shown at block 108. Method 100 may further include dispositioning risks 234, as shown at block 110. Method 100 may further include implementing disposition of risks 234, as shown at block 113. Method 100 may further include verifying an effectiveness of mitigation actions 236, as shown at block 112. The process of steps illustrated in blocks 104, 106, 108 and 110 may be repeated for other risks 234 or during evaluation of the effectiveness of mitigation actions 236 (block 112).

Referring to FIG. 2, process 202 may include any technical process, manufacturing process, production process, design process, financial process, administrative process, political process, entertainment process, or other task, function or project. Process 202 may include a start (e.g., beginning) of process 202 (referred to herein as start 230), an end (e.g., completion) of process 202 (referred to herein as end 232) and set of steps 204 occurring between start 230 and end 232. As one example, set of steps 204 may include all steps 206 (e.g., between start 230 and end 232) necessary to achieve result 212 (e.g., a particular end or output). For example, set of steps 204 may be designed (e.g., ordered) such that process 202 achieves result 212 upon end 232. As examples, result 212 may include a specific goal, a deliverable product or the like.

As one example, process 202 may include set of steps 204 taken in order to achieve result 212. Set of steps 204 may include a systematic series of steps 206 (identified individually as step 206a, step 206b, step 206c, step 206n). Set of steps 204 may be taken alone or together with one or more additional sets of steps 208 to achieve result 212. Set of steps 208 may include a systematic series of steps 206 (identified individually as step 206d, step 206e, etc.) Set of steps 204 and/or set of steps 208 (e.g., steps 206) may include actions, elements, operations, decisions and/or the like of process 202. Steps 206 may be human-performed, machine-performed, computer-performed or a combination thereof.

Steps 206 may include risks 234 (identified individually as risk 234a, risk 234b, risk 234c, risk 234d, risk 234e, risk 234n). For example, step 206a may include risk 234a, step 206b may include risk 234b, step 206c may include risk 234c, step 206d may include risk 234d, step 206e may include risk 234e and step 206n may include risk 234n. Steps 206 may include issues 238 (identified individually as issue 238a, issue 238b, issue 238c, issue 238d, issue 238e, issue 238n). For example, step 206a may include issue 238a, step 206b may include issue 238b, step 206c may include issue 238c, step 206d may include issue 238d, step 206e may include issue 238e and step 206n may include issue 238n. Issues 238 may include potential (e.g., unexpected) events 245 (identified individually as event 245a, event 245b, event 245c, event 245d, event 245e, event 245n) that cause or trigger issues 238. For example, issue 238a may include event 245a, issue 238b may include event 245b, issue 238c may include event 245c, issue 238d may include event 245d, issue 238e may include event 245e and issue 238n may include event 245n. Events 245 may be a direct and/or indirect cause that triggers a realization or manifestation of risks 234. Thus, issues 238 may be the realization of risks 234 triggered by events 245.

Those skilled in the art will recognize that process 202 may include and/or initiate one or more other processes or sub-processes. The size of process 202 may vary from a small number of total steps 206 to an extremely large number of total steps 206 (e.g., a mega-process). Large processes may be subdivided into smaller processes and/or sub-processes (e.g., each including a relatively smaller number of steps 206).

Figure 3:
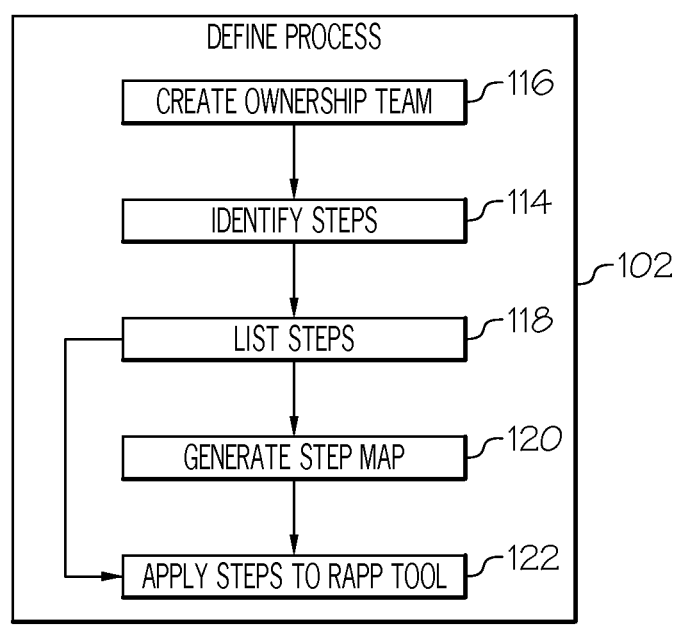
FIG. 3 is flow diagram of one embodiment of the defining a process step of the disclosed method of FIG. 1.

Referring to FIG. 3, and with reference to FIG. 2, defining process 202 (block 102) may include identifying each and every individual step 206 making up process 202, as shown at block 114. Identifying steps 206 (block 114) may include various techniques to identify each separate and/or distinct step 206 (e.g., of set of steps 204) of process 202. Identifying steps 206 (block 114) may identify and expose all risks 234 (e.g., the elements of risk) associated with steps 206 (e.g., risks 234a, 234b, 234c, 234n respectively associated with steps 206a, 206b, 206c, 206n) and/or the overall process 202.

As one example, identifying steps 206 (block 114) may include listing each individual step 206a, 206b, 206c, 206n required to execute or implement process 202 and achieve result 212, as shown at block 118. As one example, listing of steps 206 (block 118) may include identifying start 230, identifying end 232, identifying result 212 and ordering each step 206a, 206b, 206c, 206n of set of steps 204 in a correct sequence relative to other steps 206 of set of steps 204. As one example, ordering steps 206 may include ordering steps 206 by precedence. As another example, ordering steps 206 may include ordering of steps 206 chronologically. Other ordering methodologies are also contemplated.

Defining process 202 (block 102) may further include identifying any support functions associated with steps 206 (e.g., each step 206a, 206b, 206c, 206n) and/or identifying any environmental conditions and/or factors that may affect step 206.

Thus, defining process 202 (block 102) may include a critical analysis of process 202, including an analysis of each action and/or element of process 202 (e.g., human-performed, machine-performed, computer-performed, etc.), review and analysis of process data 228, an analysis of previous or similar processes, an analysis of supporting functions, an analysis of environmental conditions, discussion sessions with internal process team members and/or external guests, consultations with experts and/or specialists and the like. For example, defining process 202 (block 102) may include structured meetings in which a process management team discusses and evaluates process 202.

As one example, defining process 202 (block 102) may further include creating or ownership team 214, as shown at block 116. Creating ownership team 214 may include establishing one or more members 226 (FIG. 2) responsible and/or accountable for implementation of method 100 (FIG. 1).

Referring to FIG. 2, as one example, members 226 of ownership team 214 may include team leader 216, one or more functional members 218, one or more subject matter experts 220, and/or one or more process stakeholders 222. Other members 226 are also contemplated, including, but not limited to, suppliers and/or other parties or entities that supply inputs to process 202.

Ownership team 214 may collaborate on and share process data 228 necessary for implementation of method 100. As examples, process data 228 may include documents, information, process instructions and the like that define process 202 and/or identify steps 206 and/or risks 234. Process data 228 may be stored and/or shared within database 224. For example, database 224 may act as a shared-access repository for process data 228. Reviewing, updating and maintaining process data 228 by ownership team 214 may ensure a common understanding of process 202 by members 226.

Referring to FIG. 2, and with reference to FIG. 1, embodiments described herein may include computer system 248 and/or tool 250 (e.g., a software-based tool) for implementation of method 100. Computer system 248 and/or tool 250 may utilize process data 228. For example, computer system 248 and/or tool 246 may aid a user (e.g., member 226) to define process 202 (block 102), identify risks 234 (block 104), assess risks 234 (block 106), prioritize risks 234 (block 108), mitigate risks 234 (block 110) and/or evaluate the effectiveness of mitigation actions 236 (block 112).

Figure 4:
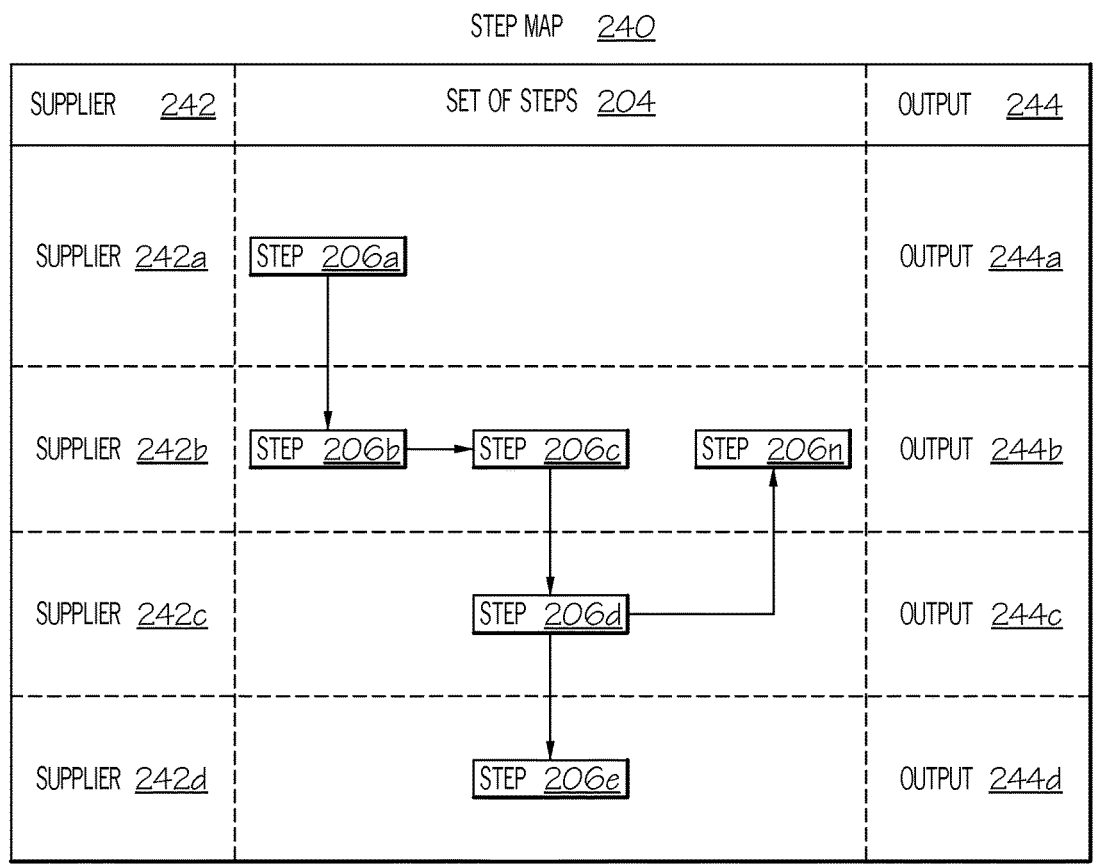
FIG. 4 is an illustration of one example of a step map.

Referring to FIG. 3, and with reference to FIGS. 2 and 4, defining process 202 (block 102) may further include generating step map 240 (FIG. 4) utilizing the identified steps 206 (block 114), as shown at block 120. Step map 240 may be one example of tool 250 or an output from tool 250. Step map 240 may provide a visualization of process 202 from start 230 to end 232. As one example, step map 240 may illustrate a product flow or execution flow of process 202. Creation of step map 240 may ensure that process 202 has all of its steps 206 correctly identified, mapped and controlled.

FIG. 4 illustrates one example of step map 240. Step 206 (e.g., step 206a, 206b, 206c, 206n) may be associated with supplier 242 and output 244. Supplier 242 may include the provider of inputs to each associated step 206a, 206b, 206c, 206n of process 202. Inputs may include any materials, resources, data, a combination thereof and the like required to execute steps 206. Output 244 may include the result of steps 206.

Referring to FIG. 3, and with reference to FIGS. 2 and 5, defining process 202 (block 102) may further include applying the identified steps 206 (block 114) to Risk Assessment Process and Presentation Tool (referred to herein as "RAPP Tool") 246, as shown at block 122. RAPP Tool 246 may be one example of tool 250 or an output from tool 250. As one example, the identified steps 206 may be manually entered into RAPP Tool 246. As another example, the identified steps 206 may be automatically entered into RAPP Tool 246, for example, from project data 228 (FIG. 2) and/or step map 240 (FIG. 4).

FIG. 5 (FIGS. 5A and 5B) illustrates one example of RAPP Tool 246. Step 206 (e.g., step 206*a*, 206*b*, 206*c*, 206*n*) may be applied to RAPP Tool 246 (block 122) (FIG. 3). Steps 206 may be ordered and provided with step number 252. As one example, the listed steps 206 (block 118) may be sequentially ordered (e.g., chronologically or by importance) within RAPP Tool 246.

Figure 20:
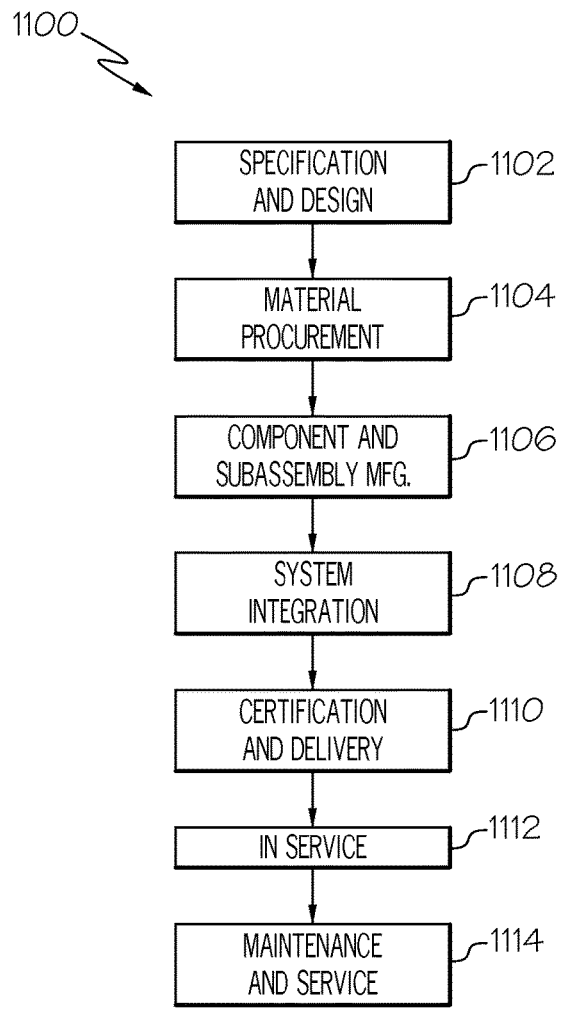
FIG. 20 is a block diagram of aircraft production and service methodology.
Figure 21:
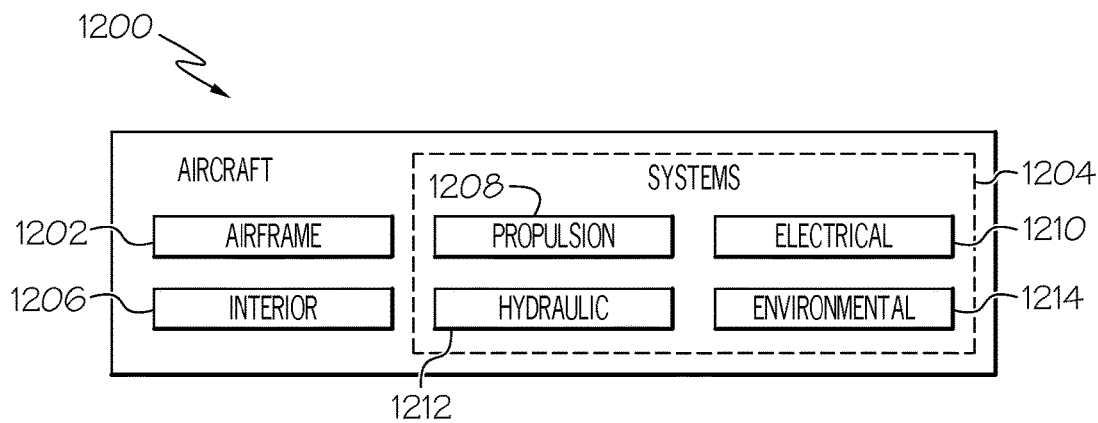
FIG. 21 is a schematic illustration of an aircraft.

Referring to FIG. 1, and with reference to FIG. 2, defining symbiotic essentials 270 (block 115) may include defining the environment required to sustain process 202. For example, defining symbiotic essentials 270 may include a critical analysis of process 202, including an analysis of elements associated with SIPOC model 330 (FIG. 20). For instance, defining symbiotic essentials 270 may include structured meetings in which a process management team discusses and evaluates process 202. Defining symbiotic essentials 270 may be performed concurrently with or subsequent to defining process 202 (block 102). As non-limiting examples, defining symbiotic essentials 270 may include, but are not limited to, defining customers 332, defining outputs 334 of process 202 (e.g., the deliverables expected by customers 332), defining inputs 336 provided to process 202 (e.g., the inputs required by process 202 to produce outputs 334) and/or defining suppliers 338 (e.g., the individual or organization that supplied inputs 336 to process 202).

In one non-limiting example implementation, symbiotic essentials 270 may be focused on suppliers 338 and/or inputs 336. For example, inputs 336 need to be sufficient to create outputs 334 resulting from process 202. Inputs 336 may include, but are not limited to, parts, materials, engineering drawings, process requirements or parameters, process planning documents, information, electrical power, environmental control, cash investments, intellectual property, software and/or other elements and resources required for the creation of outputs 334. Inputs 336 should include everything essential for the creation of outputs 334 by process 202. Thus, symbiotic essentials 270 may include, but are not limited to, buildings or facilities, controlled environments, electricity, water, air, supporting organizations, trained operators, suitable access and the like (e.g., environmental essentials).

Figure 6:
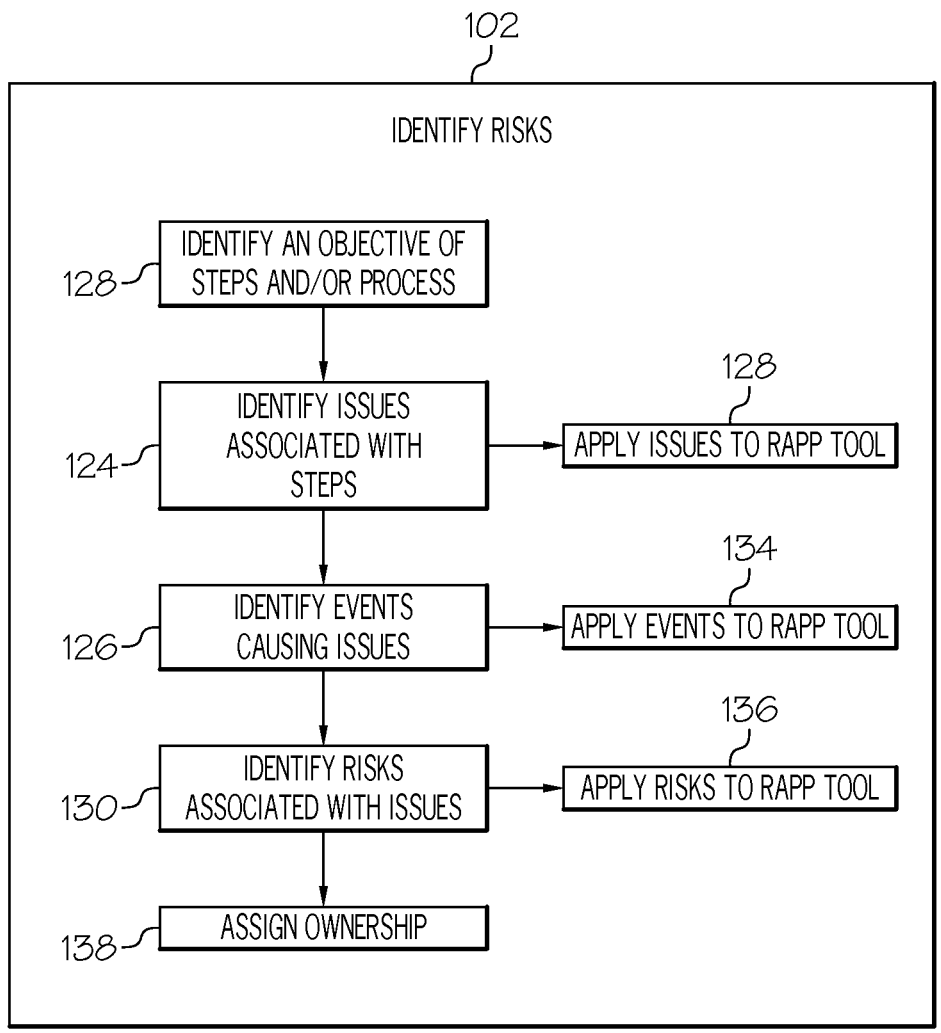
FIG. 6 is a flow diagram of one embodiment of the identifying the risks step of the disclosed method of FIG. 1.

Referring to FIG. 6, and with reference to FIG. 2, identifying risks 234 (e.g., risk 234*a*, 234*b*, 234*c*, 234*n*) (block 104) may include various techniques to identify issues 238 (e.g., each separate and/or distinct issue 238*a* 238*b*, 238*c*, 238*n*) associated with steps 206 (e.g., step 206*a*, 206*b*, 206*c*, 206*n*) of process 202 and corresponding events 254 (e.g., event 245*a*, 245*b*, 245*c*, 245*n*) that causes issues 238. Identifying risks 234 may include identifying any risks 234 associated with process 202 and/or the sustaining environment of process 202 (e.g., peripheral symbiotic essentials 270) (FIG. 2). Identifying risks 234 may include identifying issues 238 associated with steps 206, as shown at block 124. Identifying risks 234 may further include identifying events 254 associated with issues 238 of steps 206 (e.g., the cause that triggers risks 234 leading to issues 238), as shown at block 126.

Events 254 (e.g., something that could go wrong with process 202) associated with steps 206 (e.g., each step 206*a*, 206*b*, 206*c*, 206*n* identified and applied to step map 240 and/or RAPP Tool 246) may be considered and analyzed. For example, identifying and exposing risks 234 may include a critical analysis of process capability, systemic process variation, process execution, process data, process inputs, process outputs, materials, parts, environment, human factors, managerial factors, process oversight and any other applicable influences on process 202. For the identified events 254 (e.g., event 245*a*, 245*b*, 245*c*, 245*n*), an assumption may be made that issues 238 (e.g., issue 238*a* 238*b*, 238*c*, 238*n*), for example, leading to a failure mode, may occur.

Thus, identifying risks 234 (block 104) may include a critical analysis of steps 206 to identify any potential hazard and/or side effect that may negatively impact process 202, including, but not limited to, negative or potentially harmful impacts to personnel, hardware, environmental surroundings, process activities, process results (e.g., result 212) and the like.

As shown at block 128, an objective of steps 206 (e.g., output 244 (FIG. 4) associated with step 206*a*, 206*b*, 206*c*, 206*n*) and/or an objective of process 202 (e.g., result 212) may be identified. As one example, the objective of steps 206 and/or process 202 may be analyzed from a safety perspective, a performance perspective, a schedule perspective, a cost perspective, a value added perspective or the like.

Once such objectives are identified (block 128) (e.g., established through analysis of each step 206*a*, 206*b*, 206*c*, 206*n*), issues 238 that may negatively impact the objectives of steps 206 and/or process 202 may be identified (block 124). As one example, issues 238 may be identified by identifying concerns 256 (FIG. 5) associated with steps 206 that could pose harm to steps 206 and/or process 202 (e.g., negatively affect the objectives). For example, concerns 256 (identified individually as concern 256*a*, concern 256*b*, concern 256*c*, concern 256*d*, concern 256*e*, concern 256*n*) may be identified by posing "what if" scenarios associated with each of step 206*a*, 206*b*, 206*c*, 206*n*. In other words, concerns 256 may be how issues 238 happen. Once issues 238 are identified (block 124), events 254 that may lead to issues 238 may be identified (block 126).

As shown at block 130, identifying risks 234 (block 104) may further include identifying the effect and/or consequence of issues 238 (e.g., risks 234 associated with issues 238). Thus, risks 234 may be constantly present in process 202 in the form of the effect and/or consequence of issues 238 brought on by events 254. In other words, risks 234 may be the business impact resulting from issues 238 affecting process 202.

Thus, identifying risks 234 may include a critical analysis of steps 206 (e.g., step 206*a*, 206*b*, 206*c*, 206*n*) of process 202, including an analysis of every possible effect (e.g., business impact, environmental or public safety impact, etc.) anticipated by identified concerns 256 and/or events 254, review and analysis of process data 228, review of "lessons learned" documents, an analysis of similar steps of similar processes, an analysis of supporting functions, an analysis of environmental conditions, discussion sessions with internal process team members and/or external guests, consultations and/or interviews with experts and/or specialists and the like. For example, identifying risks (block 104) may include structured meetings in which a process management team (e.g., ownership team 214) discusses and evaluates steps 206, concerns 256, issues 238, events 254 and/or risks 234.

Referring to FIG. 6 and with reference to FIG. 5, concerns 256, issues 238, events 245 and/or risks 234 (e.g., effect of issues 238) associated with steps 206 may be applied to RAPP Tool 246. As shown at block 132, the identified issues 238 (block 124) associated with steps 206 may be applied to RAPP Tool 246. As shown at block 134, the identified events 254 (block 126) causing associated issues 238 may be applied to RAPP Tool 246. As shown at block 136, the identified risks 234 (block 130) resulting from issues 238 may be applied to RAPP Tool 246. Optionally, the identified concerns 256 associated with issues 238 may be applied to RAPP Tool 246. Applying concerns 256, issues 238, events 245 and/or risks 234 to RAPP Tool 246 may ensure that process 202 has all of its risks 234 correctly identified, associated with appropriate steps 206 and controlled.

While the example RAPP Tool 246, illustrated in FIG. 5, includes only a single concern 256a, 256b, 256c, 256d, 256e, 256n, issue 238a, 238b, 238c, 238d, 238e, 238n, event 254a, 254b, 254c, 254d, 254e, 254n and risk 234a, 234b, 234c, 234d, 234e, 234n respectively associated with each step 206a, 206b, 206c, 206d, 206e, 206n, those skilled in the art will recognize that steps 206 may include one or more concerns 256 and issues 238 and events 254 and risks 234 associated with issues 238. For example, each step 206a, 206b, 206c, 206d, 206e, 206n may include one or more concerns 256, each concern 256a, 256b, 256c, 256d, 256e, 256n may include one or more issues 238 and each issue 238a, 238b, 238c, 238d, 238e, 238n may include one or more events 254 and/or one or more risks 234.

Referring to FIG. 1, once risks 234 associated with steps 206 have been identified (block 104), ownership of risks 234 may be assigned, as shown at block 138. Ownership of risks 234 may be assigned to the process management team. As one example, ownership of risks 234 (e.g., each identified risk 234a, 234b, 234c, 234n) may be assigned to one or more members 226 of ownership team 214 (FIG. 2). Members 226 assigned ownership of risks 234 may be the person, entity, supplier of inputs or the like responsible for mitigating risks 234 (block 110) and/or evaluating the effects of mitigation actions 236 (block 112).

Figure 7:
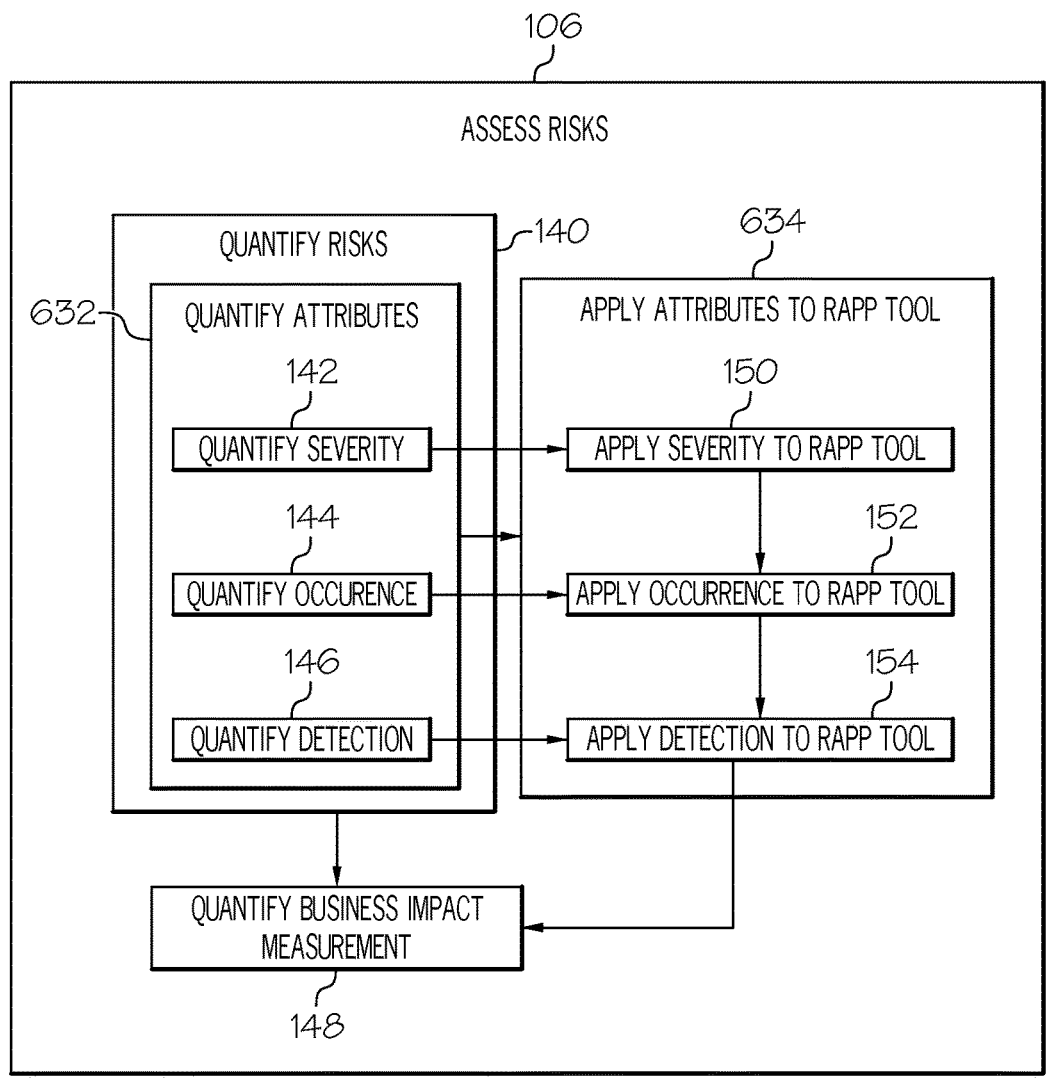
FIG. 7 is a flow diagram of one embodiment of the assessing the risks step of the disclosed method of FIG. 1.

Referring to FIG. 7, and with reference to FIG. 5, assessing risks 234 (block 106) may include quantifying risks 234, as shown at block 140. The quantification of risks 234 may be an estimation of the impact (e.g., effect) of risks 234 (e.g., each of risk 234a, 234b, 234c, 234n) on process 202. Thus, the quantification of risks 234 may be a measure of the business impact resulting from the realization of risks 234 (identified herein as "business impact measurement" ("BIM") 260). Accordingly, assessing risks 234 (block 106) may include quantifying BIM 260 based from the quantification of risks 234, as shown at block 148. Quantifying BIM 260 may include computing business impact measurement score ("BIM score") 302.

Referring to FIG. 5 (FIGS. 5A and 5B), and with reference to FIG. 7, quantification of risks 234 may be based on one or more attributes 340 associated with risks 234 corresponding to steps 206. Attributes 340 may be a dimension or parameter used to qualify risks 234. For example, and as best illustrated in FIG. 5A, risks 234 may include three attributes 340 that enable the quantification of risks 234 (block 140) and, thus, the quantification of BIM 260 (block 148).

As one example, attributes 340 may include the severity of the impact of issues 238 resulting from risk 234 (identified herein as "severity" 258). As another example, attributes 340 may include the probability (e.g., likelihood) of an occurrence of events 254 that causes issues 238 (identified herein as "occurrence" 262). For example, events 254 may be the circumstance that triggers a risk-to-issue transition. As yet another example, attributes 340 may include the probability (e.g., likelihood) that events 254 leading to issues 238 may be detected (identified herein as "detection" 264). Thus, the identified risks 234 (block 104) (FIG. 1) may be evaluated and prioritized based on quantifying each of these qualifying attributes 340 or quantifying and combining attributes 340. In other words, the combined quantification of severity 258, occurrence 262 and detection 264 may be utilized as BIM 260 to assess and prioritize risks 234 or the individual quantification of each of severity 258, occurrence 262 and detection 264 may be utilized to assess and prioritize risks 234. Accordingly, risk-dispositioning efforts may be focused on risks 234 and/or steps 206 that receive the highest prioritization. For example, risk-dispositioning efforts may be focused on risks 234 and/or steps 206 having the highest associated BIM 260.

In the embodiments described herein, other numbers and/or types of attributes 340 qualifying risks 234 (e.g., risk 234a, 234b, 234c, 234n) may be used depending upon, for example, the type of process 202, steps 206 defining process 202 and/or the particular implementation of the embodiment.

Referring to FIG. 7, and with reference to FIG. 5, assessing risks 234 (block 104) may include quantifying attributes 340, as shown at block 632. In one example implementation, assessing risks 234 may include quantifying severity 258 (e.g., of each issue 238), as shown at block 142. Assessing risks 234 may further include quantifying occurrence 262 (e.g., of each event 254) causing associated issue 238, as shown at block 144. Assessing risks 234 may further include quantifying detection 264 (e.g., of each event 254 or issue 238), as shown at block 146.

Therefore, the quantitative analysis of risks 234 (block 106) may include quantifying (e.g., scoring) attributes 340 associated with risks 234 to generate attribute scores 344 associated with attributes 340. For example, attribute scores 344 may be based on a pre-defined quantification scale 266, as illustrated in FIG. 8 (FIGS. 8A and 8B), and may be utilized to quantify BIM 260 (block 148) and prioritize risks 234 (block 108). Prioritizing risks 234 may be performed based on BIM score 302 (e.g., the quantified BIM 260). As one example, BIM score 302 may include (e.g., be calculated from) a combination of attribute scores 344 of at least two attributes 340.

As one example, and as best illustrated in FIG. 7, the quantitative analysis of risks 234 (block 140), including the quantitative analysis of severity 258 (block 142), the quantitative analysis of occurrence 262 (block 144) and the quantitative analysis of detection 264 (block 146), may include estimating the severity of the impact of issues 238 resulting from risks 234, estimating the probability of the occurrence of events 254 that causes issues 238 and estimating the probability that events 254 leading to issues 238 may be detected based on quantification scale 266, which may be utilized to quantify BIM 260 and prioritize risks 234. Thus, severity 258 may include severity score 296, occurrence 262 may include occurrence score 298 and detection 264 may include detection score 300. BIM 260 may include BIM score 302. BIM score 302 may include a combination of at least two of severity score 296, occurrence score 298 and/or detection score 300

FIG. 8 (FIGS. 8A and 8B) illustrates one example of quantification scale 266. As one example, quantification scale 266 may be qualitative. For example, quantification scale 266 and may be divided into categories (e.g., user defined categories) with qualitative measurements of attributes 340. As one example, and best illustrated in FIGS. 8A and 8B, attributes 340 may include severity 258, occurrence 262 and detection 264. As another example, quantification scale 266 may be associated with numerical values 268. For example, quantification scale 266 may include numerical values 268 ranging from 1 to 10 associated with each qualitative measurement of attributes 340 (e.g., severity 258, occurrence 262 and detection 264). The associated attribute scores 344 (e.g., severity score 296, occurrence score 298 and detection score 300) may be an appropriate numerical value 268 based on quantification scale 266.

In accordance with quantification scale 266 exemplified in FIGS. 8A and 8B, numerical value 268 of 1 may indicate (e.g., quantify as) a lowest attribute score 344. For example, numerical value 268 of 1 may indicate a lowest severity of the impact of issues 238 resulting from risks 234 (e.g., severity score 296), a lowest probability of the occurrence of events 254 that causes issues 238 (e.g., occurrence score 298) and a lowest probability that events 254 leading to issues 238 may be detected (e.g., detection score 300). Numerical value 268 of 10 may indicate (e.g., quantify as) a highest attribute score 344. For example, numerical value 268 of 10 may indicate a highest severity of the impact of issues 238 resulting from risks 234 (e.g., severity score 296), a highest probability of the occurrence of events 254 that causes issues 238 (e.g., occurrence score 298) and a highest probability that events 254 leading to issues 238 may be detected (e.g., detection score 300). Thus, attributes 340 (e.g., severity 258, occurrence 262 and detection 264) may be rated or scored on quantification scale 266 from 1 to 10.

Referring to FIG. 2, embodiments described herein may provide and/or utilize computer system 248 and/or tool 250 to assist in the quantification and/or qualification of the identified risks 234 (e.g., associated with process 202).

Referring to FIG. 7, and with reference to FIGS. 5 and 8, assessing risks 234 (block 106) may further include applying attributes 340 to RAPP Tool 246, as shown at block 634. As one example, assessing risks 234 may include applying severity 258 (e.g., numerical value 268 associated with severity 258 or severity score 296) to RAPP Tool 246, as shown at block 150. Assessing risks 234 may further include applying occurrence 262 (e.g., numerical value 268 associated with occurrence 262 or occurrence score 298) to RAPP Tool 246, as shown at block 152. Assessing risks 234 may further include applying detection 264 (e.g., numerical value 268 associated with detection 264 or detection score 300) to RAPP Tool 246, as shown at block 154. RAPP Tool 246 may quantify BIM 260 by combining the quantifications of attributes 340 (e.g., severity 258, occurrence 262 and detection 264). Applying attributes 340 of risks 234 (e.g., severity 258, occurrence 262 and detection 264) to RAPP Tool 246 may ensure that process 202 has all of its risks 234 correctly quantified. Thus, RAPP Tool 246 may enable detection and magnitude assessments of business-impacts related to process 202.

As one example, the quantification of BIM 260 may be determined (e.g., generated by RAPP Tool 246) by multiplying numerical value 268 (e.g., score) associated with attributes 340. For instance, the quantification of BIM 260 may be determined by multiplying numerical value 268 associated with severity 258, occurrence 262 and detection 264 (e.g., Severity Score 296×Occurrence Score 298×Detection Score 300=BIM Score 302).

Figure 9:
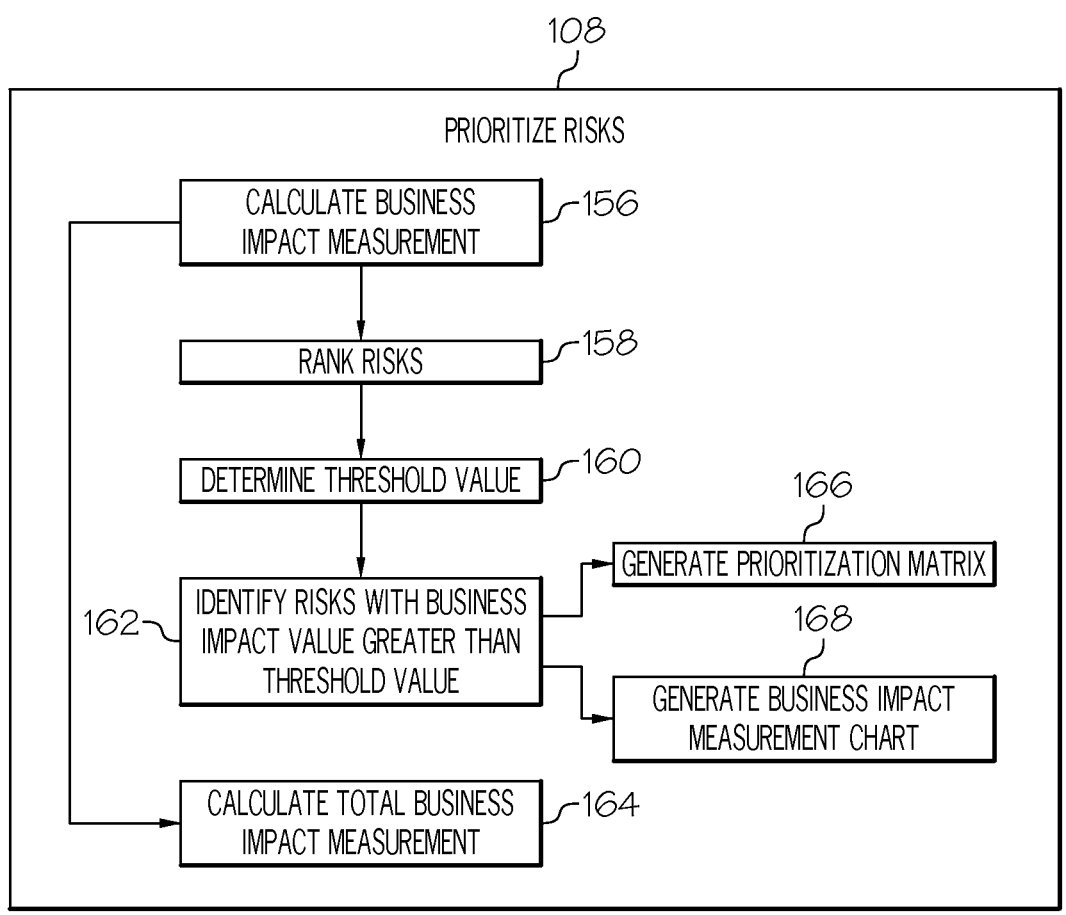
FIG. 9 is a flow diagram of one embodiment of the prioritizing the risks step of the disclosed method of FIG. 1.
Figure 10:
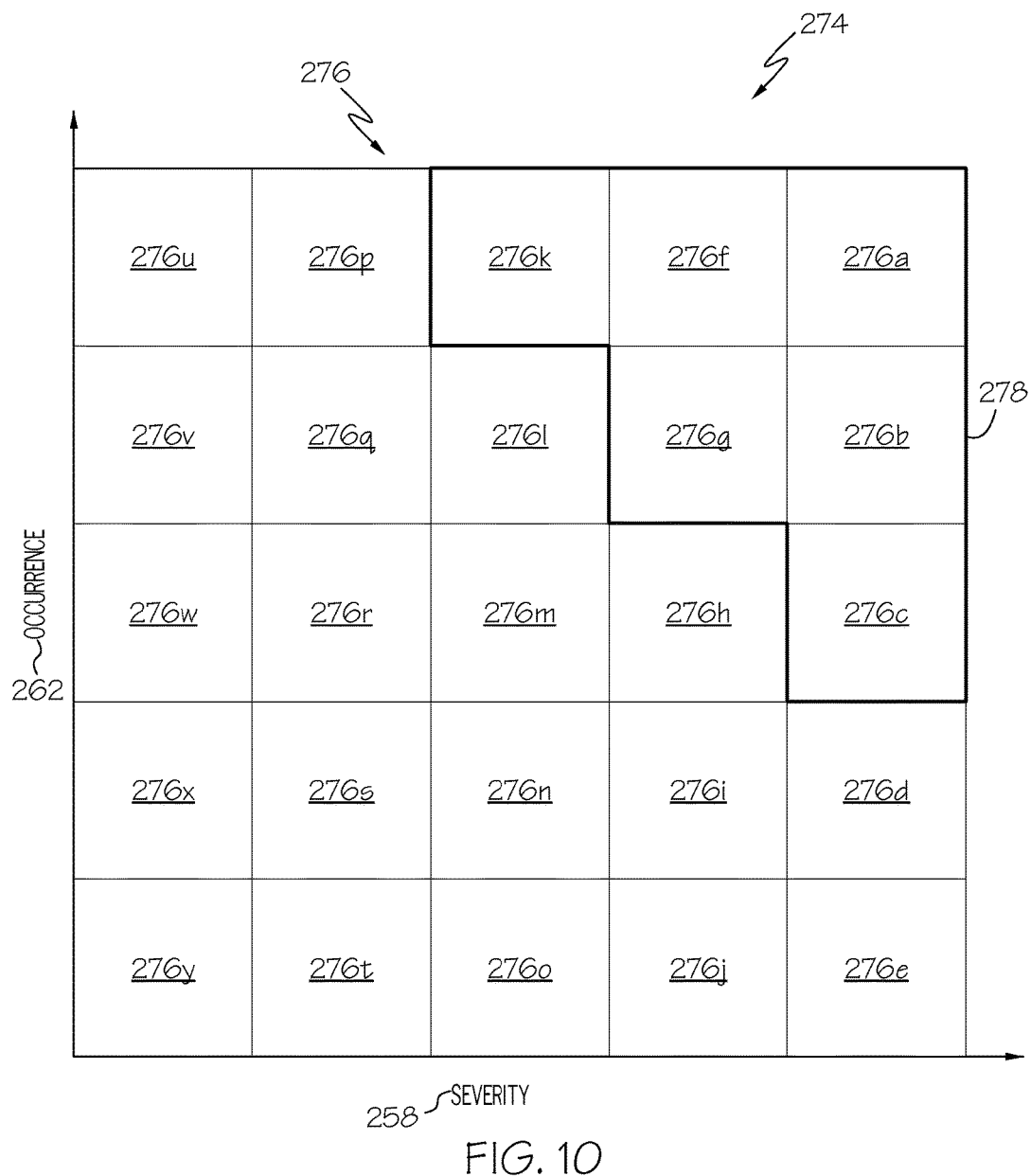
FIG. 10 is an illustration of one example of a prioritization matrix.

Referring to FIG. 9, and with reference to FIG. 5 and FIG. 10, prioritizing risks 234 (block 108) may include calculating BIM 260 (e.g., BIM score 302), as shown at block 156. The calculation of BIM 260 may be determined from the quantification of BIM 260 (block 148) (FIG. 7). As one example, BIM 260 (e.g., BIM score 302) may be calculated automatically by RAPP Tool 246.

As shown at block 158, risks 234 may be ranked or sorted based on the calculated BIM 260 (block 156) or the quantified BIM 260 (block 148). Risks 234 may be sorted in ascending or descending order based on BIM score 302. As one example, risks 234 may be ranked from the highest calculated value of BIM 260 to the lowest calculated value of BIM 260.

Figure 11:
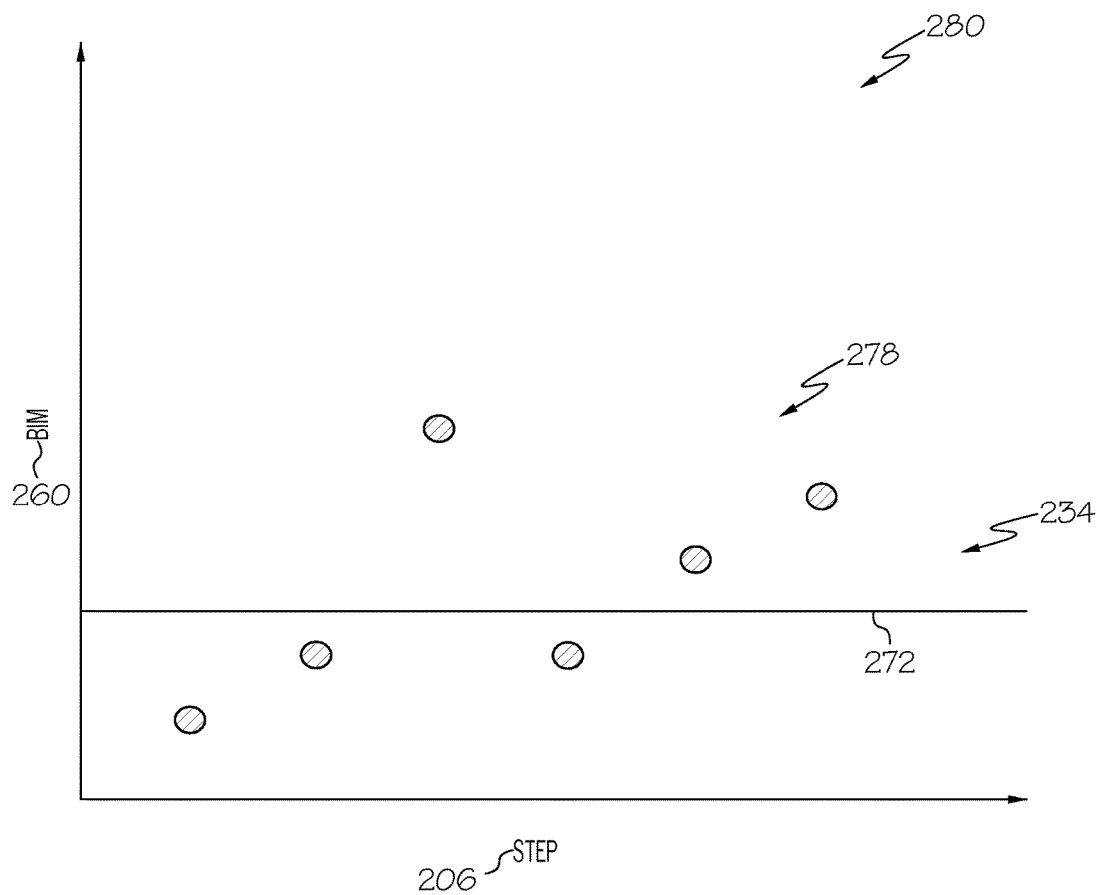
FIG. 11 is an illustration of one example of a business impact measurement chart.

As shown at block 160, a business impact measurement threshold value (referred to herein as "threshold value" 272), as illustrated in FIG. 11, may be determined. Threshold value 272 may define a minimum acceptable business impact measurement for risks 234. As shown at block 162, any risks 234 having BIM 260 (e.g., BIM score 302) greater than threshold value may be identified for prioritization. Thus, risk mitigation efforts may be focused on identified risks 234 having BIM 260 greater than threshold value (e.g., risks 234 that are identified for prioritization). A similar process may be utilized to prioritize and disposition issues 238.

In addition to or alternately, an attribute threshold value may be determined. The attribute threshold value may define a minimum acceptable value of the quantified attributes 340. Any risks 234 having a quantified value of attributes 340 (e.g., attribute scores) greater than the attribute threshold value may be identified for prioritization. Thus, risk dispositioning efforts may be focused on identified risks 234 having BIM 260 greater than threshold value 272 and/or identified risks 234 having attribute scores 344 greater than the attribute threshold value (e.g., risks 234 that are identified for prioritization). A similar process may be utilized to prioritize and disposition issues 238.

As one example, a severity threshold value may be determined. The severity threshold value may define a minimum acceptable value of the quantified severity 258 (block 142). Any risks 234 having a quantified value of severity 258 (e.g., severity score 296) greater than the severity threshold value may be identified for prioritization. Thus, risk dispositioning efforts may be focused on identified risks 234 having BIM 260 greater than threshold value 272 and/or identified risks 234 having severity score 296 greater than the severity threshold value (e.g., risks 234 that are identified for prioritization). A similar process may be utilized to prioritize and disposition issues 238.

As another example, an occurrence threshold value may be determined. The occurrence threshold value may define a minimum acceptable value of the quantified occurrence 262 (block 144). Any risks 234 having a quantified value of occurrence 262 (e.g., occurrence score 298) greater than the occurrence threshold value may be identified for prioritization. Thus, risk dispositioning efforts may be focused on identified risks 234 having BIM 260 greater than threshold value 272 and/or identified risks 234 having occurrence score 298 greater than the occurrence threshold value (e.g., risks 234 that are identified for prioritization). A similar process may be utilized to prioritize and disposition issues 238.

As yet another example, a detection threshold value may be determined. The detection threshold value may define a minimum acceptable value of the quantified detection 264 (block 146). Any risks 234 having a quantified value of detection 264 (e.g., detection score 300) greater than the detection threshold value may be identified for prioritization. Thus, risk dispositioning efforts may be focused on identified risks 234 having BIM 260 greater than threshold value 272 and/or identified risks 234 having detection score 300 greater than the occurrence threshold value (e.g., risks 234 that are identified for prioritization). A similar process may be utilized to prioritize and disposition issues 238.

Referring to FIG. 9, and with reference to FIG. 5 and FIG. 10, prioritizing risks 234 may further include generating prioritization matrix 274 (FIG. 10), as shown at block 166. Prioritization matrix 274 may be one example of tool 250 (FIG. 2) or an output from tool 250. Prioritization matrix 274 may provide a visualization of identified risks 234 (block 162) based on the calculated BIM 260 (block 156) for risks 234 (e.g., risk 234*a*, 234*b*, 234*c*, 234*n*). As one example, the values or scores used to calculate BIM 260 may be used to categorize risks 234 within a region of prioritization matrix 274. As one example, the numerical values 268 used for quantifying severity 258 (e.g., severity score) and occurrence 262 (e.g., occurrence score) may be used to categorize risks 234 within a region of prioritization matrix 274. For example, each of the regions in prioritization matrix 274 may be defined according to severity 258 and occurrence 262.

FIG. 10 illustrates one example of prioritization matrix 274. Prioritization matrix 274 may be divided into regions 276 (identified individually as regions 276*a*-276) as needed to categorize risks 234 based upon severity 258 and occurrence 262. For example, region 276*a* may represent risks 234 having a quantified severity 258 (e.g., severity score based on quantifying scale 266) of between 9-10 and a quantified occurrence 262 (e.g., occurrence score based on quantifying scale 266) of between 9-10. Region 276*b* may represent risks 234 having a quantified severity 258 of between 9-10 and a quantified occurrence 262 of between 7-8. Region 276*c* may represent risks 234 having a quantified severity 258 of between 9-10 and a quantified occurrence 262 of between 5-6. Region 276*d* may represent risks 234 having a quantified severity 258 of between 9-10 and a quantified occurrence 262 of between 3-4. Region 276*e* may represent risks 234 having a quantified severity 258 of between 9-10 and a quantified occurrence 262 of between 1-2.

Region 276*u* may represent risks 234 having a quantified severity 258 of between 1-2 and a quantified occurrence 262 of between 9-10. Region 276*v* may represent risks 234 having a quantified severity 258 of between 1-2 and a quantified occurrence 262 of between 7-8. Region 276*w* may represent risks 234 having a quantified severity 258 of between 1-2 and a quantified occurrence 262 of between 5-6. Region 276*x* may represent risks 234 having a quantified severity 258 of between 1-2 and a quantified occurrence 262 of between 3-4. Region 276*y* may represent risks 234 having a quantified severity 258 of between 1-2 and a quantified occurrence 262 of between 1-2.

Region 276*f* may represent risks 234 having a quantified severity 258 of between 7-8 and a quantified occurrence 262 of between 9-10. Region 276*k* may represent risks 234 having a quantified severity 258 of between 5-6 and a quantified occurrence 262 of between 9-10. Region 276*p* may represent risks 234 having a quantified severity 258 of between 3-4 and a quantified occurrence 262 of between 9-10.

Regions 276*g*-276*i*, 276*l*-276*n* and 276*q*-276*s* may represent risks 234 having a quantified severity 258 and a quantified occurrence 262 in a consistent manner.

Certain selected regions 276 of prioritization matrix 274 may be designated as areas of interest or prioritized risks 278. For example, risks 234 positioned in regions 276*a*, 276*b*, 276*c*, 276*f*, 276*g* and 276*k* may receive the classification of "priority risks" and then have appropriate response plans and/or mitigation actions 236 enacted in order to mitigate risks 234 (block 112) (FIG. 1). As one example, risks 234 positioned in regions 276*a*, 276*b*, 276*c*, 276*f*, 276*g* and 276*k* may be those risks 234 with BIM 260 greater than threshold value 272 and/or risks 234 with severity 258 and occurrence 262 greater than severity threshold and occurrence threshold.

Risks 234 positioned in regions 276*d*, 276*e*, 276*h*, 276*i*, 276*l*, 276*m*, 276*p*, 276*q* and 276*r* may receive a classification of "risks under observation" and remain under a regular monitoring for verification of any possible change in their status to "priority risks". Risks 234 positioned in regions 276*j*, 276*n*, 276*o*, 276*s*, 276*t* and 276*u*-276*y* may receive a classification of "mitigation not required".

While the present disclosure describes prioritization matrix 274 as having twenty-five defined regions classified into three classifications or categories, those skilled in the art will appreciate that any numbers of regions (e.g., based on the numerical scale of quantification scale 266) and/or categorization criteria may be defined as desired by a user. As one example, either or both of the severity axis and occurrence axes utilized to delimitate classification of risks 234 in prioritization matrix 274 can have their position changed according to process 202. For example, for processes having greater risk aversion or more conservative business impact measurements, prioritization matrix 274 may be adapted to increase the scope of risks 234 to be examined with greater scrutiny, such as enlarging the scope of included regions 276 to increase the area considered to be priority risks 278.

Referring to FIG. 9, and with reference to FIG. 11, prioritizing risks 234 may further include generating business impact measurement chart 280, as shown at block 168. Business impact measurement chart 280 may be one example of tool 250 (FIG. 2) or an output from tool 250. Business impact measurement chart 280 may provide a visualization of risks 234 defined by BIM 260 relative to steps 206 of process 202.

FIG. 11 illustrates one example of business impact measurement chart 280. Business impact measurement chart 280 may plot the values or scores of the calculated BIM 260 (block 156) (FIG. 9) of risks 234 versus steps 206 or step numbers 252 from RAPP Tool 246 (FIG. 5). Business impact measurement chart 280 may also include a visual representation of threshold value 272. Risks 234 having BIM 260 greater than threshold value 272 may be clearly represented as lying above a threshold value line. Thus, risks 234 positioned above threshold value 272 may be classified as prioritized risks 278.

Optionally, a total business impact for the entire process 202 (referred to herein as total business impact "TBIM") may be calculated, as shown at block 164. For example, a sum of the calculated BIM 260 associated with risks 234 may be calculated. TBIM may be utilized during evaluation of the effectiveness of mitigation actions 236 (block 112) on process 202 as a whole.

Figure 12:
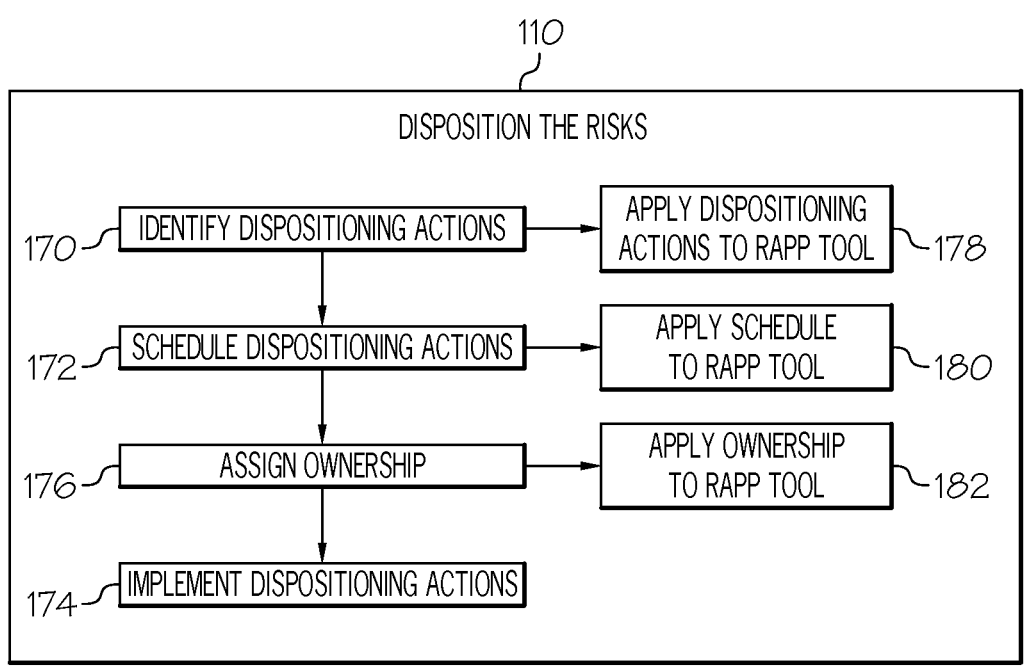
FIG. 12 is a flow diagram of one embodiment of the dispositioning the risks step of the disclosed method of FIG. 1.

Referring to FIG. 12, and with reference to FIGS. 5A and 5B, dispositioning risks 234 (block 110) may include identifying dispositioning actions 236 (identified individually as dispositioning action 236*a*, dispositioning action 236*b*, dispositioning actions 236*c*, dispositioning action 236*d*, dispositioning action 236*e* and dispositioning action 236*n* in FIG. 5A), as shown at block 170. One or more dispositioning actions 236 may be identified for each risk 234*a*, 234*b*, 234*c*, 234*n*.

Dispositioning actions 236 may include various action options that may be performed. As one example, dispositioning actions 236 may include avoiding risks 234. As another example, dispositioning actions 236 may include accepting risks 234. As another example, dispositioning actions 236 may include accepting risks 234. As another example, dispositioning actions 236 may include deferring risks 234. As another example, dispositioning actions 236 may include transferring risks 234. As yet another example, dispositioning actions 236 may include mitigating risks 234. Other appropriate dispositioning actions 236 are also contemplated.

Thus, as used herein a "dispositioning actions" generally refers to any appropriate course of action, for example, selected from one or more of the examples provided above, performed to address the identified risks.

Referring to FIG. 20, identifying dispositioning actions 236 (block 170) may include determining whether risks 234 (FIG. 2) are significant, for example, do the identified risks 234 (e.g., block 104) result in a significant business impact (e.g., BIM 260), as shown at block 600. When risks 234 are not significant, dispositioning actions 236 (e.g., avoiding, transferring, deferring, assuming and/or mitigating) are optional. When risks 234 are not significant, risks 234 may be monitored and/or periodically reviewed to reassess the business impact of risks 234, as shown at block 602.

When risks 234 are significant (block 600), identifying dispositioning actions 236 may include determining whether risks 234 can be avoided, as shown at block 604. When risks 234 can be avoided, dispositioning actions 236 may be directed to avoiding risks 234 (e.g., an avoiding action), as shown at block 606. As non-limiting examples, avoiding actions may include, but are not limited to, implementing an alternative approach, modifying process 202, removing steps 206 associated with risks 234, altering the schedule of process 202, altering the funding of process 202, altering resources and/or process requirements (e.g., inputs 336) and the like.

When risks 234 cannot be avoided (block 604), identifying dispositioning actions 236 may include determining whether risks 234 can be transferred, as shown at block 608. When risks 234 can be transferred, dispositioning actions 236 may be directed to transferring risks 234 (e.g., a transferring action), as shown at block 610. As non-limiting examples, transferring actions may include reallocating resources and/or process requirements (e.g., inputs 336), developing companion processes, revising the terms associated with process 202 (e.g., revising contracts) and the like.

When risks 234 cannot be transferred (block 608), identifying dispositioning actions 236 may include determining whether risks 234 can be deferred, as shown at block 612. When risks 234 can be deferred, disposition actions 236 may be directed to deferring risks 234 (e.g., a deferring action), as shown at block 614. As a non-limiting example, deferring actions may include, but are not limited to, re-using an old (e.g., heritage) approach to process 202.

When risks 234 cannot be deferred (block 612), identifying dispositioning actions 236 may include determining whether risks 234 should be assumed, as shown at block 616. When risks 234 should be assumed, dispositioning actions 236 may be directed to assuming risks 234 (e.g., an assuming action), as shown at block 618. As non-limiting examples, assuming actions may include, but are not limited to, advertising and/or informing of risks 234, transferring risks 234 to appropriate ownership (e.g., ownership team 214), understanding risks 234 (e.g., acquiring pertinent information related to risk 234), enhancing detectability of risks 234, monitoring changes to risks 234, exploiting technical performance measures, monitoring earned value, cost and schedule of process 202 and the like. Risks 234 may be periodically reassessed.

When risks 234 should not be assumed (block 616), identifying dispositioning actions 236 may include determining whether risks 234 can be mitigated, as shown at block 620. When risks 234 cannot be mitigated, management of risks 234 may be directed to a process manager (e.g., ownership team 214), as shown at block 622. Examples of risk management when risks 234 cannot be mitigated may include, but are not limited to, securing insurance, establishing a compromise with customer 332, providing different dispositioning actions and the like.

When risks 234 can be mitigated, dispositioning actions 236 may be directed to mitigating risks 234 (e.g., a mitigating action), as shown at block 624. As non-limiting examples, mitigating actions may include, but are not limited to, developing a risk mitigation plan, verifying implementation of the mitigation actions, validating the effectiveness of the mitigation actions and the like.

Dispositioning actions 236 may be focused on mitigating risks 234 (e.g., mitigating actions) (block 624) and, thus, mitigating actions may be the most common and/or advantageous dispositioning actions 236. For example, a mitigating action may be determined with the goal of reducing BIM 260 of risks 234 by a pre-selected factor (e.g., a factor of four). As one example, dispositioning actions 236 (e.g., mitigating actions) may be defined or determined that will reduce the severity of the impact of issues 238 resulting from risks 234 and, thus, reduce severity 258 (e.g., severity score 296) and overall BIM 260 (e.g., BIM score 302) for the associated risks 234. As another example, dispositioning actions 236 (e.g., mitigating actions) may be determined that will reduce the probability of an occurrence of events 254 that causes issues 238 and, thus, reduce occurrence 262 (e.g., occurrence score 298) and overall BIM 260 (e.g., BIM score 302) for the associated risks 234. As yet another example, dispositioning actions 236 (e.g., mitigating actions) may be determined that will increase the probability that events 254 leading to issues 238 may be detected and, thus, reduce detection 264 (e.g., detection score 300) and overall BIM 260 (e.g., BIM score 302) for the associated risks 234. Mitigation efforts may be focused on increasing the probability of detection (e.g., decreasing detection 264), as such efforts may be the easiest and most likely to lead to measurable results.

Upon mitigating risks 234 (block 624), identifying dispositioning actions 236 may further include determining whether a fallback position for risks 234 is required, as shown at block 626. When a fall position is not required, the mitigating actions may be archived, as shown at block 628. Archiving the mitigating actions may include, but is not limited to, reviewing the risk mitigation plan, approving the risk mitigation plan, advertising the risk mitigation plan, scheduling the mitigating actions, assigning ownership of the mitigating actions, implementing the mitigating actions and the like.

When a fallback position is required, a fallback position may be developed, as shown at block 630. Developing the fallback position may include, but is not limited to, modifying process requirements (e.g., steps 206 and/or inputs 336), eliminating process requirements, utilization of different process requirements, modifying the process schedule, modifying the process budget and the like.

Thus, identifying dispositioning actions 236 (block 170) may include a critical analysis of steps 206 and associated risks 234 focusing on decreasing the severity of issues 238, decreasing the probability of events 254 and/or increasing detection of events 254 and/or issues 238 associated with steps 206 and/or risks 234. For example, identifying mitigating actions (e.g., a risk mitigation plan) may include planning mitigation and contingency actions, and establishing goals.

Referring to FIG. 12, when identifying dispositioning actions 236 (block 170) results in mitigating risks 234 (e.g., mitigating actions), dispositioning risks 234 (block 110) may further include scheduling dispositioning actions 236 (e.g., mitigating actions) (referred to herein as "schedule" 282) (FIG. 5B). Schedule 282 may include an implementation date or a completion date (identified herein as "date" 286) of the mitigating actions. As shown at block 174, dispositioning risks 234 (block 110) may further include implementing the identified dispositioning actions 236 (e.g., mitigating actions) (block 170.)

As shown at block 176, dispositioning risks 234 may further include assigning ownership of dispositioning actions 236 (e.g., mitigating actions) (referred to herein as "ownership" 284) (FIG. 5B). For example, assigning ownership of dispositioning actions 236 (block 176) may include defining responsibility for risks 234 and the mitigating actions. As one example, a single person (e.g., member 226) or group (e.g., ownership team 214) may be designated to be responsible for mitigating risks 234, in charge of planning the mitigation actions required for dispositioning risks 234 associated with process 202 (e.g., reducing severity 258, occurrence 262 and/or detection 264), responsible for monitoring and control of the mitigating actions and evaluating the effectiveness of the dispositioning actions 236 (e.g., mitigating actions (block 112) (FIG. 1).

Embodiments described herein may provide computer system 248 and/or tool 250 that allow users (e.g., members 226) to separately address each of the identified risks 234 as needed to provide appropriate responses, schedule dispositioning actions 236, implement dispositioning actions 236 and/or maintain continuous control over (e.g., ownership of) dispositioning actions 236. As shown at block 178, dispositioning actions 236 may be applied to RAPP Tool 246 (FIGS. 5A and 5B). As shown at block 180, schedule 282 of dispositioning actions 236 may be applied to RAPP Tool 246. As shown at block 182, ownership 284 of dispositioning actions 236 may be applied to RAPP Tool. Thus, RAPP Tool 246 may enable tracking and control of dispositioning actions 236 and, particularly, mitigating actions associated with risks 234.

Figure 13:
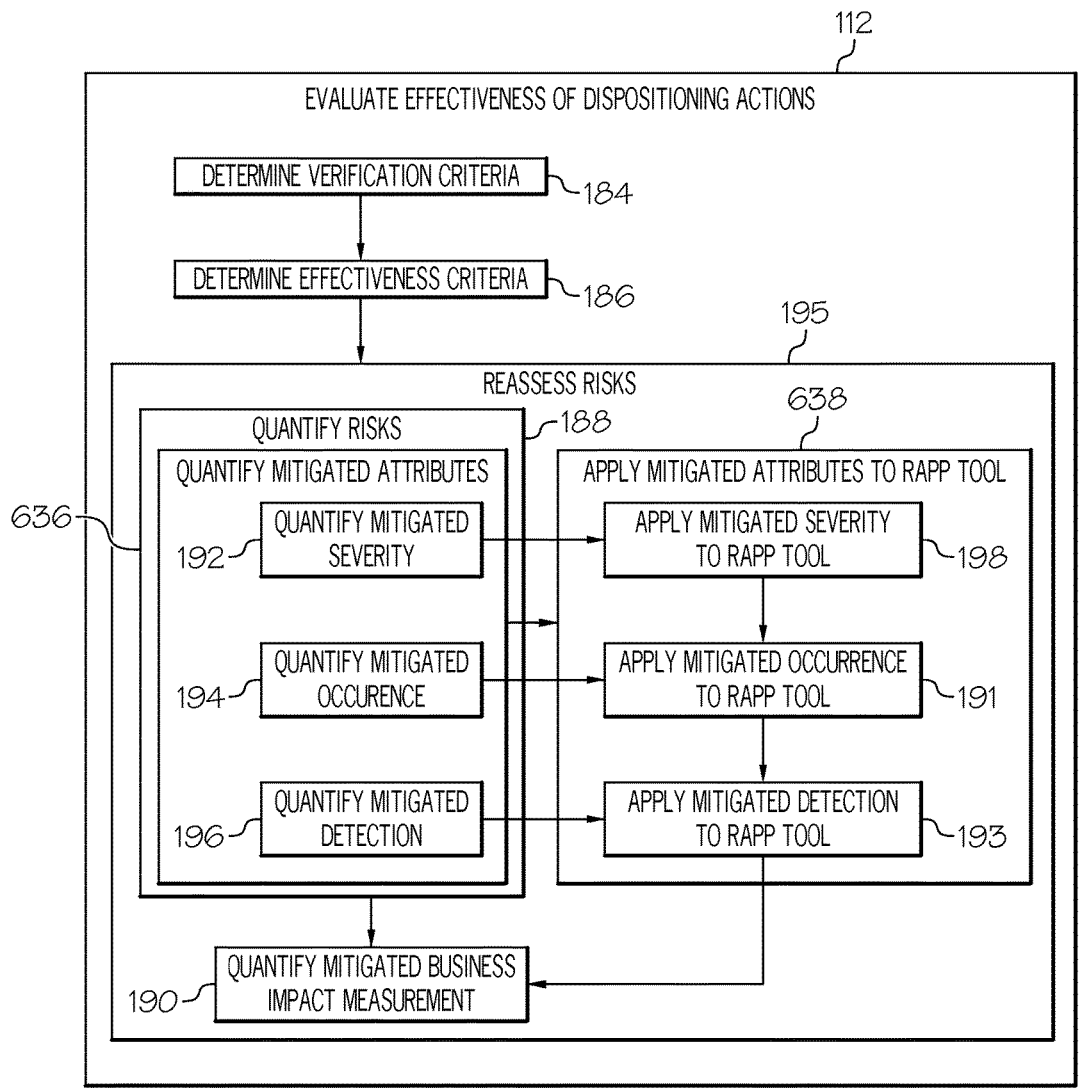
FIG. 13 is a flow diagram of one embodiment of the evaluating the effectiveness of the disposition actions step of the disclosed method of FIG. 1.

Referring to FIG. 13, and with reference to FIG. 5, when identifying dispositioning actions 236 (block 170) results in mitigating risks 234 (e.g., mitigating actions), evaluating the effectiveness of dispositioning actions 236 may include determining verification criteria for dispositioning actions 236 (e.g., mitigating actions), as shown at block 184. Verification criteria may include how implementation of disposition actions 236 may be verified. As shown at block 186, evaluating the effectiveness of dispositioning actions 236 may further include determining effectiveness criteria for dispositioning actions 236. Effectiveness criteria may include how the effectiveness of dispositioning actions 236 (e.g., mitigating actions) may be evaluated and/or verified.

During evaluation of the effectiveness of dispositioning actions 236, risks 234 may be monitored, the mitigation actions may be followed-up and any results may be evaluated (e.g., brought up to date). Further, during evaluation of the effectiveness of dispositioning actions 236, new risks 234 may be identified and/or existing risks 234 may be addressed or reprioritized by recursively repeating the steps identified at blocks 104, 106, 108 and 110 (FIG. 1).

As shown at block 188, evaluating the effectiveness of dispositioning actions 236 may further include reassessing risks 234 in view of or in response to the identified dispositioning actions 236 (e.g., mitigating actions) (block 170), as shown at block 195. Reassessing risks 234 may include quantifying risks 234 in view of or in response to the mitigation actions, as shown at block 188. The quantification of risks 234 in view of the mitigation actions may be an estimation of the impact (e.g., effect) of each risk 234 on process 202 in view of or in response to the corresponding mitigation action. Thus, the quantification of risks 234 in view of the mitigation actions may be a measure of the business impact resulting from the realization of risks 234 in view of or in response to the mitigation actions (identified herein as "mitigated business impact measurement" ("mitigated BIM") 288) (FIG. 5B). Accordingly, reassessing risks 234 (block 188) may include quantifying mitigated BIM 288 based from the quantification of risks 234 in view of or in response to the mitigation actions, as shown at block 190.

Reassessing risks 234 (block 188) may include quantifying attributes 340 of risks 234 in view of or in response to the identified dispositioning actions 236 (e.g., mitigating actions) (referred to herein as "mitigated attribute" 346), as shown at block 636. The quantification of mitigated attributes 345 may be based on quantification scale 266 (FIGS. 8A and 8B). Thus, mitigated attributes 346 may include mitigated attribute scores 348 and mitigated BIM 288 may include mitigated business impact measurement score "mitigated BIM score" 310. Mitigated BIM score 310 may include a combination of mitigated attribute scores 348 of at least two mitigated attributes 346.

For example, reassessing risks 234 may include quantifying the severity of the impact of issues 238 resulting from risks 234 in view of or in response to the identified dispositioning actions 236 (e.g., mitigating actions) (referred to herein as "mitigated severity" 290) (FIG. 5B), as shown at block 192. Reassessing risks 234 may further include quantifying the probability of an occurrence of events 254 that causes issues 238 in view of or in response to dispositioning actions 236 (e.g., mitigating actions) (referred to herein as "mitigated occurrence" 292) (FIG. 5B), as shown at block 194. Reassessing risks 234 may further include quantifying the probability that events 254 leading to issues 238 may be detected in view of or in response to dispositioning actions 236 (e.g., mitigating actions) (referred to herein as "mitigated detection" 294) (FIG. 5B), as shown at block 196. The same process may be used for reassessing risks 234 based on other mitigated attributes.

Referring to FIG. 5B, the quantification of mitigated severity 290, mitigated occurrence 292 and mitigated detection 294 may be based on quantification scale 266 (FIGS. 8A and 8B). Thus, mitigated severity 290 may include mitigated severity score 304, mitigated occurrence 292 may include mitigated occurrence score 306, mitigated detection 294 may include mitigated detection score 308 and mitigated BIM 288 may include mitigated BIM score 310.

Referring to FIG. 2, embodiments described herein may include or provide computer system 248 and/or tool 250 to track and/or evaluate the status of the identified risks 234, the effectiveness of mitigation actions 236 (e.g., mitigating efforts), monitor the overall status of process 202, and provide such information to users (e.g., members 226) as needed.

Reassessing risks 234 (block 188) may further include applying mitigated attributes 346 (e.g., mitigated attribute scores 348) to RAPP Tool 246, as shown at block 638. For example, reassessing risks 234 may further include applying mitigated severity 290 (e.g., mitigated severity score 304) to RAPP Tool 246, as shown at block 198. Reassessing risks 234 may further include applying mitigated occurrence 292 (e.g., mitigated occurrence score 306) to RAPP Tool 246, as shown at block 191. Reassessing risks 234 may further include applying mitigated detection 294 (e.g., mitigated detection score 308) to RAPP Tool 246, as shown at block 193. RAPP Tool 246 may quantify mitigated BIM 288 by combining the quantifications of mitigated severity 290, mitigated occurrence 292 and mitigated detection 294. Applying the mitigated parameters of risk 234 (e.g., mitigated severity 290, mitigated occurrence 292 and mitigated detection 294) to RAPP Tool 246 may provide an evaluation of the effectiveness of mitigation actions 236. Thus, RAPP Tool 246 may enable assessment of business-impact risks related to process 202 in view of or in response to mitigation actions 236.

As one example, the quantification of mitigated BIM 288 may be determined (e.g., generated by RAPP Tool 246) by multiplying numerical value 268 (e.g., score) associated with mitigated severity 290, mitigated occurrence 292 and mitigated detection 294 (e.g., Mitigated Severity Score 304×Mitigated Occurrence Score 306×Mitigated Detection Score 308=Mitigated BIM Score 310).

Improvement 312 in process risk may also be provided (e.g., calculated by RAPP Tool 246). Improvement 312 may be factor 314 of improvement between BIM 260 (e.g., BIM Score 302) and mitigated BIM 288 (e.g., mitigated BIM score 310).

Referring to FIGS. 1, 12, 13 and 20, in certain implementations of disclosed method 100, scheduling dispositioning actions 236 (block 172), assigning ownership (block 176), implementing dispositioning actions 236 (block 174) and evaluating the effectiveness of dispositioning actions 236 (block 112) may only be necessary when the identified dispositioning actions 236 (block 170) result in mitigating actions (block 624) and/or transferring actions (block 610). Accordingly, quantifying mitigated severity 290 (block 192), quantifying mitigated occurrence 292 (block 194), quantifying mitigated detection 294 (block 196), quantifying mitigated BIM 288 (block 190) and applying the same to RAPP Tool 246 (blocks 198, 191 and 193) may only be appropriate when the identified dispositioning actions 236 (block 170) results in mitigating actions (block 624) and/or transferring actions (block 610). Similarly, when the identified dispositioning actions 236 (block 170) result in avoiding actions (block 606), deferring actions (block 614) and/or assuming actions (block 618), there may not be a calculation of mitigated severity 290, mitigated occurrence 292, mitigated detection 294 and/or mitigated BIM 288, since no mitigating actions were performed.

Referring to FIG. 1, and with reference to FIG. 2, method 100 may further include securing sponsorship, as shown at block 117. Securing sponsorship may include determining (e.g., finding) an appropriate sponsor 328 (FIG. 2) having a vested interest in the disposition (e.g., mitigation) of risks 234. Among other things, securing sponsorship may ensure that the voice of the business to be heard, the disposition of risks 234 is guided by business drivers, the disposition of risks 234 answers a business need, the disposition of risks 234 is appropriately prioritized, appropriate funds and/or resources are available to perform dispositioning actions 236, dispositioning actions 236 are properly implemented, verification of effectiveness of dispositioning actions 236 are completed before the process-based risk analysis process is closed, the process-based risk analysis process is properly advertised within the business, appropriate communication with customer 332 is maintained, any barriers to the success of the process-based risk analysis process are removed and the like.

Modifications, additions, or omissions may be made to method 100 without departing from the scope of the present disclosure. Method 100 may include more, fewer, or other steps. Additionally, steps may be performed in any suitable order.

Referring to FIG. 15, in certain implementations of disclosed method 100 (FIG. 1), one or more attributes 340 may include one or more categories 342. For example, and as best illustrated in FIG. 15, severity 258 may include various categories 342 (e.g., three categories 342 are illustrated in FIG. 15). For instance, severity 258 may include technical severity 316, schedule severity 318 and cost severity 320. Technical severity 316 may be the severity of the impact of issue 238 resulting from risk 234 on the technical aspects of process 202 (e.g., a negative technical business impact). Schedule severity 318 may be the severity of the impact of issue 238 resulting from risks 234 on the scheduling aspects of process 202 (e.g., a negative schedule business impact). Cost severity 320 may be the severity of the impact of issue 238 resulting from risks 234 on the cost aspects of process 202 (e.g., a negative cost business impact). Each of technical severity 316, schedule severity 318 and cost severity 320 may include technical severity score 322, schedule severity score 324 and cost severity score 326, respectively, for example, based on the numerical scale (e.g., numerical value 268) of quantification scale 266 (FIGS. 8A and 8B).

While not explicitly illustrated in FIG. 15, other categories 342 of attributes 340 (e.g., other negative business impacts) are also contemplated. For example, other categories of severity 258 may include, but are not limited to, function severity, safety severity, profit severity, return on investment severity, etc. Each of these other categories 342 may include an associated attribute score, for example, based on the numerical scale (e.g., numerical value 268) of quantification scale 266 (FIGS. 8A and 8B).

Figure 14:
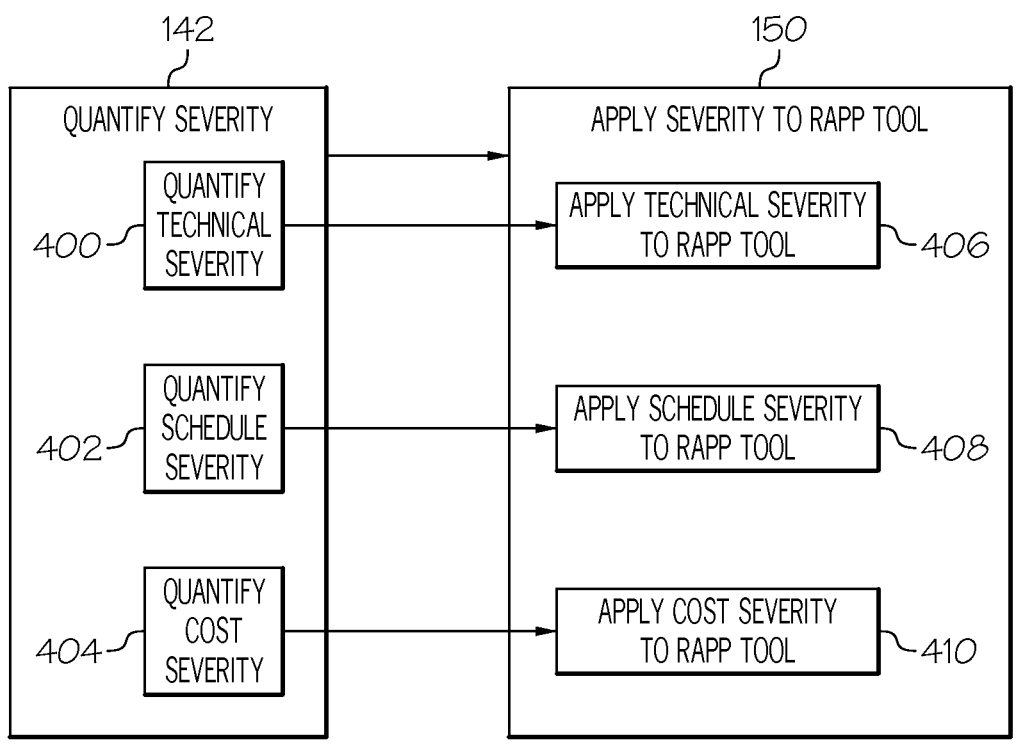
FIG. 14 is a flow diagram of one embodiment of the quantifying of severity step of the disclosed method of FIG. 1.

Referring to FIG. 14, and with reference to FIGS. 7 and 15, in another embodiment of disclosed method 100 (FIG. 1), quantifying attributes 340 during quantification of risk 234 (block 140) may include quantifying each category 342 of attribute 340. For example, quantifying severity 258 (block 142) (FIG. 7) during the assessment of risks 234 (block 106) may include quantifying technical severity 316, as shown at block 400. Quantifying severity 258 may further include quantifying schedule severity 318, as shown at block 402. Quantifying severity 258 may further include quantifying cost severity 320, as shown at block 404.

Thus, the quantitative analysis of attributes 340 may include a quantitative analysis of each category 342. For example, the quantitative analysis of severity 258 (block 142) (FIG. 14), including the quantitative analysis of technical severity 316 (block 400), the quantitative analysis of schedule severity 318 (block 402) and the quantitative analysis of cost severity 320 (block 404) may include estimating the severity of the impact of issues 238 resulting from risks 234 on the technical, schedule and cost aspects of process 202 (FIG. 2) based on quantification scale 266 (FIGS. 8A and 8B), which may be utilized to quantify BIM 260 (block 148) and prioritize risks (block 108). Thus, quantifying severity 258 (block 142) may include quantifying technical severity 316 as technical severity score 322, quantifying schedule severity 318 as schedule severity score 324 and quantifying cost severity 320 as cost severity score 326.

Similarly, in one example implementation, applying severity 258 to RAPP Tool 246 (block 150) (FIG. 7) may include applying technical severity 316 (e.g., technical severity score 322) to RAPP Tool 246, as shown at block 406, applying schedule severity 318 (e.g., schedule severity score 324) to RAPP Tool 246, as shown at block 408 and applying cost severity 320 (e.g., cost severity score 326) to RAPP Tool 246, as shown at block 410. RAPP Tool 246 may quantify BIM 260 by combining the quantifications of each of technical severity 322, schedule severity 318 and cost severity 320 with occurrence 262 and detection 264.

FIG. 15 illustrates another example of RAPP Tool 246. The quantification of BIM 260 (block 140) (FIG. 7) may be calculated for more than one category 342 of attributes 340 (e.g., severity 258) (FIG. 5). For example, and as illustrated in FIG. 15, severity 258 may be categorized as technical severity 316, schedule severity 318 and cost severity 320. A corresponding BIM score (identified as BIM score 302a, BIM score 302b and BIM score 302c, respectively) may be calculated for each category 342 of attributes 340.

As one example, BIM score 302a (e.g., BIM associated with technical severity 316) may be determined (e.g., generated by RAPP Tool 246) by multiplying numerical value 268 (e.g., scores) associated with technical severity 316, occurrence 262 and detection 264 (e.g., Technical Severity Score 322×Occurrence Score 298×Detection Score 300=BIM Score 302a). As another example, BIM score 302b (e.g., BIM associated with schedule severity 318) may be determined (e.g., generated by RAPP Tool 246) by multiplying numerical value 268 (e.g., scores) associated with schedule severity 318, occurrence 262 and detection 264 (e.g., Schedule Severity Score 324×Occurrence Score 298×Detection Score 300=BIM Score 302b). As yet another example, BIM score 302c (e.g., BIM associated with cost severity 320) may be determined (e.g., generated by RAPP Tool 246) by multiplying numerical value 268 (e.g., scores) associated with cost severity 320, occurrence 262 and detection 264 (e.g., Cost Severity Score 326×Occurrence Score 298×Detection Score 300=BIM Score 302b).

As illustrated in FIG. 15, an overall BIM score 302d may be determined (e.g., generated by RAPP Tool 246) to represent the average of the categorized BIM scores. For example, the overall BIM score 302d may be an average of BIM score 302a, BIM score 302b and BIM score 302c.

As described herein above, any one of categories 342 of attributes 340 may be replaces by another different category 342. For example, any one or more of categories 342 (e.g., severity 258 technical severity 316, schedule severity 318 and cost severity 320) of severity 258 may be replaced, for example, by safety severity, profit severity or the like. A corresponding BIM score associated with the replacement category 342 of attributes 340 (e.g., severity 258) may be determined (e.g., generated by RAPP Tool 246), as described above.

While not explicitly illustrated, in other embodiments of the disclosed method 100 (FIG. 1), a single attribute 340 may be quantified multiple times (e.g., independently by multiple members 226 and/or from different points of view) (FIG. 2). For example, each category 342 of attribute 340 may be associated with a particular individual quantification of attribute 340. For instance, severity 258 may be quantified multiple times by different members 226 of ownership team 214. Thus, each quantification of attribute 340 (e.g., severity 258), for example, based on based on quantification scale 266 (FIGS. 8A and 8B), may provide a different attribute score (e.g., severity score 296) associated with each risk 234. A corresponding BIM score 302 associated with each different quantifier of attribute 340 may be determined (e.g., generated by RAPP Tool 246), as described above. For example, RAPP Tool 246 may compute a separate BIM score (e.g., BIM Score 302a, BIM score 302b, BIM score 302c) for each member 226, compute an overall (e.g., average) BIM score 302d or select a particular BIM score based on a predetermined factor (e.g., the highest BIM score or the lowest BIM score).

In the example embodiments described herein, the BIM score (e.g., BIM score 302, overall BIM score 302d or any of the categorized BIM scores 302a, 302b, 302c) may have a value ranging from 1 to 1000, based on the assigned (e.g., quantified) numerical value (e.g., score) ranging from 1 to 10 for each of severity 258 (or technical severity 316, schedule severity 318 and cost severity 320), occurrence 262 and detection 264 based on quantification scale 266 (FIGS. 8A and 8B).

The disclosed systems and methods embodied herein may be used for various functional purposes. For example, RAPP Tool 246 may include a variety of different appearances and/or different attributes 340 depending upon a particular process 202 in order to serve a diverse set of executive, managerial and/or functional purposes. Each unique realization of RAPP Tool 246 may be termed as a case.

The exemplary RAPP Tool 246 illustrated in FIGS. 5A, 5B may be one example of a case for the purpose of process-based analysis of, for example, a technical process and focusing on identifying, assessing, prioritizing and dispositioning risks 234 associated with steps 204. In such an example, steps 206 may be the steps or actions of process 202 requiring inputs 336 and delivering outputs 334. Prioritizing and dispositioning risks 234 may be, for example, based on BIM 260 quantified by particular attributes 340 of risk 234 corresponding to steps 206.

The exemplary RAPP Tool 246 illustrated in FIG. 15 may be another example of a case for the purpose of process-based analysis of, for example, a technical process and focusing on identifying, assessing, prioritizing and dispositioning risks 234 associated with steps 206. In such an example, steps 206 may be the steps or actions of process 202 requiring inputs 336 and delivering outputs 334. Prioritizing and dispositioning risks 234 may be, for example, based on BIM 260 quantified by particular categories 342 of attributes 340 of risks 234 corresponding to steps 206.

While not explicitly illustrated, as another example of a case, RAPP Tool 246 may be used for the purpose of process-based analysis of, for example, an administrative process and focusing on identifying, assessing and prioritizing issues 238 and/or risks 234 associated with steps 206. Thus, as one example, RAPP Tool 246 may be designed to serve as a priority discriminator for executive-level resolution of issues 238 or risk 234. In such an example, process 202 may be an administrative meeting or forum and steps 206 may be agenda items to be addressed during the meeting. Each agenda item (e.g., steps 206) may include one of issues 238 or risks 234. RAPP Tool 246 may serve to provide guidance in the prioritization of issues 238 or risks 234, for example, focusing on the resolution of the most significant issues 238 or risks 234 affecting the business or enterprise. Prioritizing issues 238 and/or risks 234 may be, for example, based on BIM 260 (e.g., the potential business impact from the corresponding issue or risk associated with each agenda item).

In one example realization of such a priority discriminator case, RAPP Tool 246 may be directed to a predetermined number of (e.g., three) attributes 340 of significant issues 238. For example, attributes 340 may include, but are not limited to, technical influence, impact urgency, value, financial impact or the like. In this case, RAPP Tool 246 may be designed to present issues 238 from the perspective of customer 332 and, for example, with sensitivity to the priorities of the business. Once BIM 260 has been analyzed (e.g., upon BIM score 302 being determined) for issues 238, RAPP Tool 246 may sort issues 238, for example, based on the highest BIM scores 302. The sorted issues 238 may then be used as the basis for a meeting agenda, defining not only issues 238 by priority, but also providing guidance (e.g., time allocation) for each issue 238.

Figure 16:
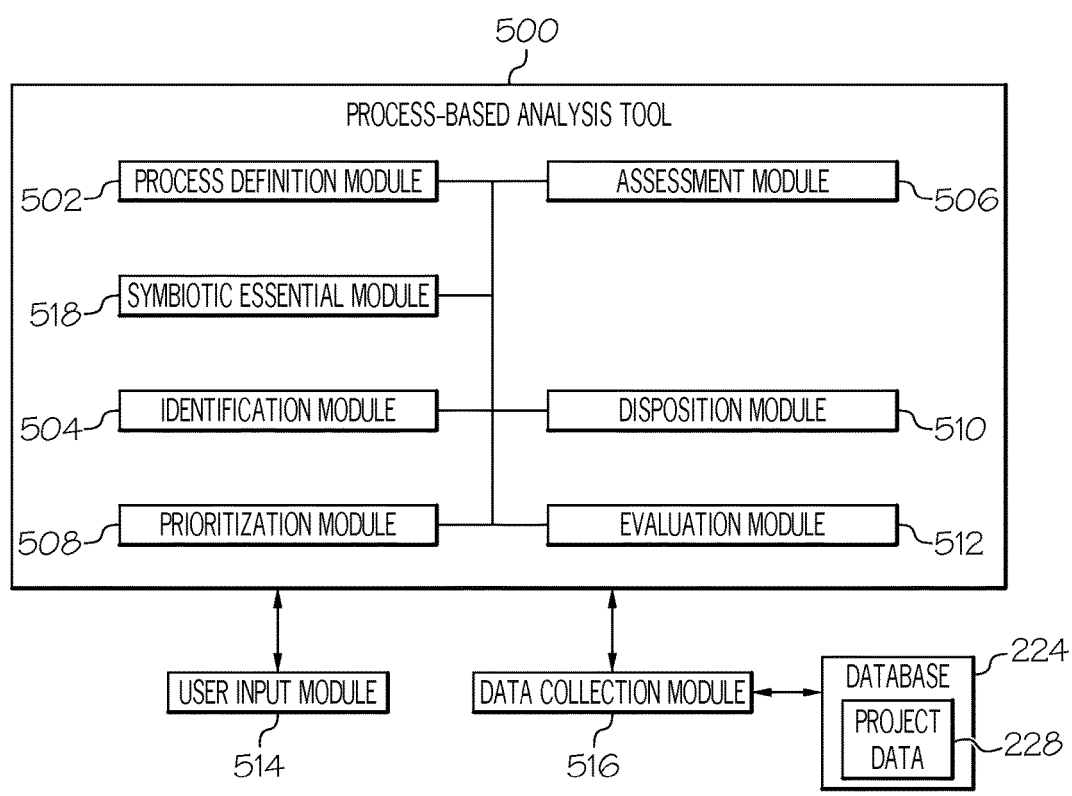
FIG. 16 is a schematic block diagram of one embodiment of the disclosed process-based analysis tool.

Referring to FIG. 16, and with reference to FIG. 2, embodiments disclosed herein may provide a computerized process-based analysis tool 500. Process-based analysis tool 500 may implement the disclosed process-based risk analysis method 100 (FIG. 1). Process-based analysis tool 500 may be one example of tool 250 (FIG. 2). In order to support the entire process-based analysis process, process-based analysis tool 500 may integrate the steps of defining process 202, identifying issues 238, identifying risks 234, assessing risks 234, prioritizing risks 234 and evaluating the effectiveness of dispositioning actions 236.

Referring to FIG. 16, and with reference to FIGS. 5A, 5B and 15, process-based analysis tool 500 may be capable of prioritizing risks 234 and/or issues 238 by quantifying (e.g., estimating) various attributes 340 associated with risks 234 and/or issues 238 (e.g., severity 258, occurrence 262, detection 264), quantifying (e.g., calculating) BIM 260, ranking risks 234 and/or issues 238 based on BIM 260 and identifying significant risks 234 and/or issues 238, for example, those with BIM 260 greater than threshold value 272. Additionally, process-based analysis tool 500 may provide for a workflow that includes substantially the whole process, with all those involved being constantly informed on the status of issues, risks, dispositioning actions and/or mitigation responses.

Referring to FIG. 16, and with reference to FIG. 1, process-based analysis tool 500 may be a software-driven application including modules that automatically perform each of the steps of the process-based analysis method 100 (with the possible exception of implementing dispositioning actions 236). As examples, process-based analysis tool 500 may include process definition module 502 for performing (e.g., configured to perform) the function of defining process 202, identification module 504 for performing the function of identifying risks 234 and/or identifying issues 238, assessment module 506 for performing the function of assessing risks 234 and/or issues 238, prioritization module 508 for performing the function of prioritizing risks 234 and/or issues 238, disposition module 510 for performing the function of dispositioning risks 234 and evaluation module 512 for performing the function of evaluating the effectiveness of dispositioning actions 236. Process-based analysis tool 500 may further include symbiotic essential module 518 for performing the function of defining symbiotic essentials 270 of process 202.

For example, in one implementation, process-based analysis tool 500 may be a spreadsheet application (such as an application written Excel® or in Visual Basic® for Excel®, both commercially available from Microsoft Corp. of Redmond, Wash.) that receives various process data 228 and/or user inputs, and utilizes such data and inputs as needed for disclosed method 100.

In another embodiment, process-based analysis tool 500 may include user input module 514 that allows a user (e.g., member 226 or other person assigned ownership) to edit or specify process data 228. As one example, user input module 514 may include a modifiable spreadsheet containing fields to allow the user to specify various aspects of process 202 (e.g., steps 206, events 254, issues 238, risks 234, attributes 340, categories 342, etc.), along with known technology to receive and store the user's inputs. As another example, user input module 514 may include a served webpage form containing blank fields or drop down menus to allow the user to specify various aspects of process 202, along with known technology to receive and store the user's inputs. As one specific example, RAPP Tool 246 may be a realization of process-based analysis tool 500.

Process-based analysis tool 500 may further visually display results through user input module 514. As one specific example, prioritization matrix 274 and/or business impact measure chart 280 may be outputs from process-based risk analysis tool 500.

Process-based analysis tool 500 may further include data collection module 516 that automatically collects relevant external process data 228. For example, data collection module 516 may be programmed to collect relevant process data 228 in real time so that risk analysis may be performed and repeated using recent and/or updated data. As one example, data collection module 516 may include software application, such as data mining applications (e.g., in Extended Meta Language (XML)) (not shown), that automatically searches for and returns relevant process data 228 from database 224.

Optionally, process-based analysis tool 500 may be connected to user input module 514 and/or data collection module 516 remotely via a distributed network such as the Internet. In such an embodiment, process-based risk analysis tool 500 may be an application present on an Internet server that is accessible to various users and applications via the distributed network.

Process-based analysis tool 500 may be implemented by computer system 248 (FIG. 2). Computer system 248 may include one or more computers. When more than one computer is present in computer system 248, the computers may be in communication with each other over a communications medium (e.g., using wired and/or wireless communications links or computer network).

The illustrated embodiment of process-based analysis tool 500 in FIG. 16 is not meant to provide physical or architectural limitations to the manner in which different embodiments may be implemented. Other modules in addition to and/or in place of the ones illustrated may be used. Some modules may be unnecessary in some example embodiments. Also, the blocks are presented to illustrate some functional components. One or more of these blocks may be combined and/or divided into different blocks when implemented in different embodiments.

Figure 17:
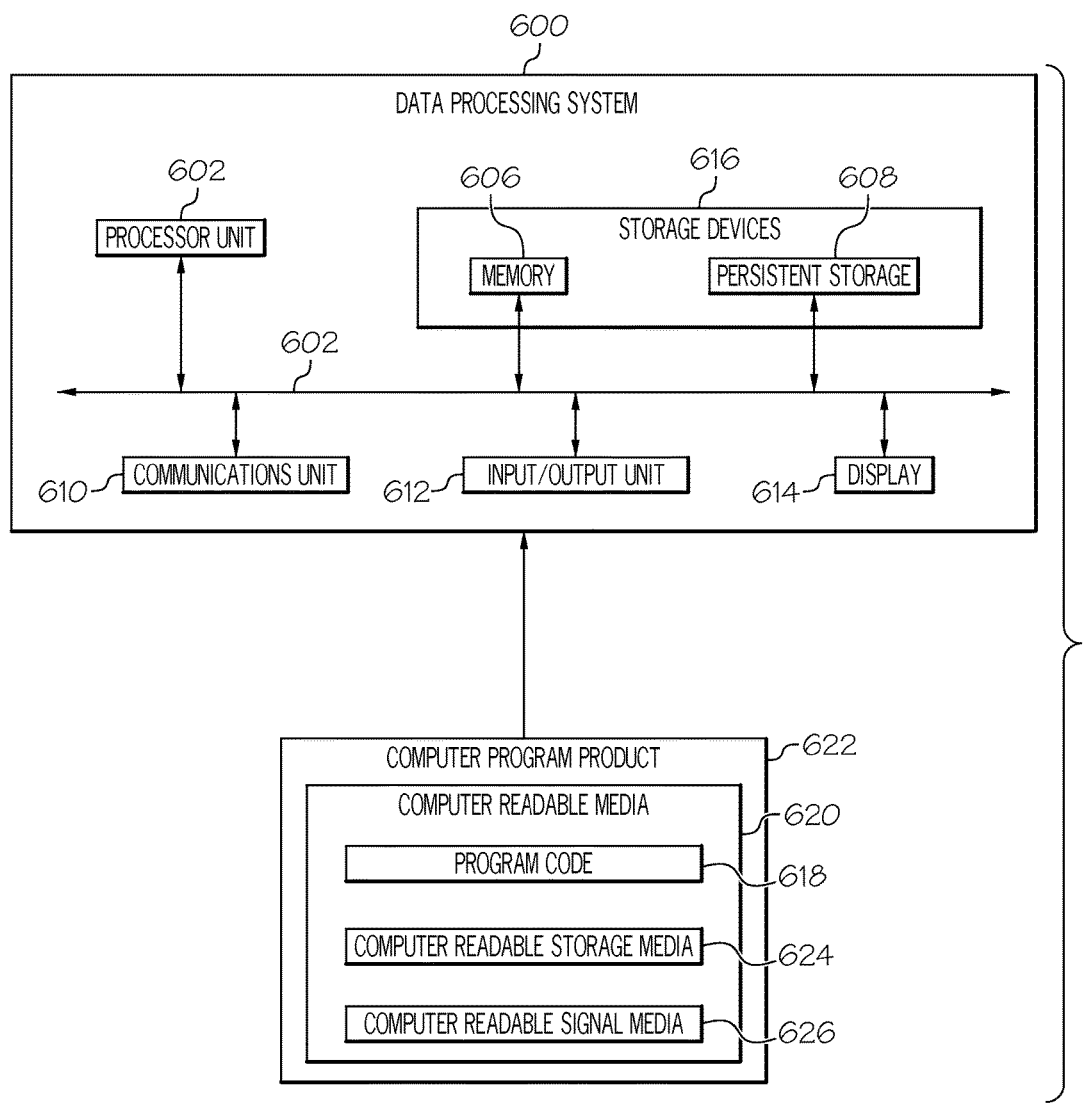
FIG. 17 is a schematic block diagram of one embodiment of a data processing system.

FIG. 17 illustrates one embodiment of data processing system 600. Data processing system 600 may be an example of a data processing system used to perform function provided by computers of computer system 248 (FIG. 1). Data processing system 600 may include communications bus 602, which provides communications between processor unit 604, memory 606, persistent storage 608, communications unit 610, input/output ("I/O") unit 612, and display 614.

Communications bus 602 may include one or more buses, such as a system bus or an input/output bus. Communications bus 602 may be implemented using any suitable type of architecture that provides for a transfer of data between different components or devices attached to the bus system.

Processor unit 604 may serve to execute instructions for software that may be loaded into memory 606. Processor unit 604 may be one or more processors or may be a multi-processor core, depending on the particular implementation. As one example, processor unit 604 may be implemented using one or more heterogeneous processor systems, in which a main processor is present with secondary processors on a single chip. As another example, processor unit 604 may be a symmetric multi-processor system containing multiple processors of the same type.

Memory 606 and persistent storage 608 may be examples of storage devices 616. Storage device 616 may be any piece of hardware that is capable of storing information including, but not limited to, data, program code in functional form, and/or other suitable information either on a temporary basis and/or a permanent basis. For example, memory 606 may be a random access memory or any other suitable volatile or non-volatile storage device.

Persistent storage 608 may take various forms, depending on the particular implementation. Persistent storage 608 may contain one or more components or devices. For example, persistent storage 608 may be a hard drive, a flash memory, a rewritable optical disk, a rewritable magnetic tape, or some combination thereof. The media used by persistent storage 608 may be removable. For example, a removable hard drive may be used for persistent storage 608.

Communications unit 610 may provide for communication with other data processing systems or devices. As one example, communications unit 610 may include a network interface card. As another example, communications unit 610 may include one or more devices used to transmit and receive data, such as a modem or a network adapter. Communications unit 610 may provide communications through the use of wired and/or wireless communications links.

Input/output unit 612 may allow for the input and output of data with other devices connected to data processing system 600. For example, input/output unit 612 may provide a connection for input through a keyboard, a mouse, and/or some other suitable input device. Further, input/output unit 612 may send output to a printer and/or display 614. Display 614 may provide a mechanism to display information.

Instructions for the operating system, applications, and/or programs may be located in storage devices 616, which are in communication with processor unit 604 through communications bus 602. As one example, the instructions are in a functional form on persistent storage 608. The instructions may be loaded into memory 606 for execution by processor unit 604. The processes of the different embodiments may be performed by processor unit 604 using computer implemented instructions, which may be located in a memory, such as memory 606.

The instructions may be referred to as program code, computer usable program code, or computer readable program code that may be read and executed by a processor in processor unit 604. The program code, in the different embodiments, may be embodied on different physical or computer readable storage media, such as memory 606 or persistent storage 608.

Program code 618 may be located in a functional form on the computer readable media 620 that is selectively removable and may be loaded onto or transferred to data processing system 600 for execution by processor unit 604. Program code 618 and computer readable media 620 may form computer program product 622. In one example, computer readable media 620 may be computer readable storage media 624 or computer readable signal media 626.

Computer readable storage media 624 may include, but is not limited to, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, a network apparatus, the cloud, or a flash memory that is connected to data processing system 600. In some instances, computer readable storage media 624 may not be removable from data processing system 600.

Alternatively, program code 618 may be transferred to data processing system 600 using computer readable signal media 626. For example, computer readable signal media 626 may be a propagated data signal containing program code 618. Computer readable signal media 626 may include, but is not limited to, an electromagnetic signal, an optical signal, and/or any other suitable type of signal. These signals may be transmitted over communications links, such as wireless communications links, a wire, an optical fiber cable, a coaxial cable, transmission line and/or any other suitable type of communications link.

In one example embodiment, program code 618 may be downloaded (e.g., over a network) to persistent storage 608 from another device or data processing system through computer readable signal media 626 for use within data processing system 600. For example, program code stored in computer readable storage media in a server data processing system may be downloaded over a network from the server to data processing system 600. The data processing system providing program code 618 may be a server computer, a client computer, or some other device capable of storing and transmitting program code 618.

The illustrated embodiment of data processing system 600 in FIG. 17 is not meant to provide physical or architectural limitations to the manner in which different embodiments may be implemented. Other components in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

Figure 18:
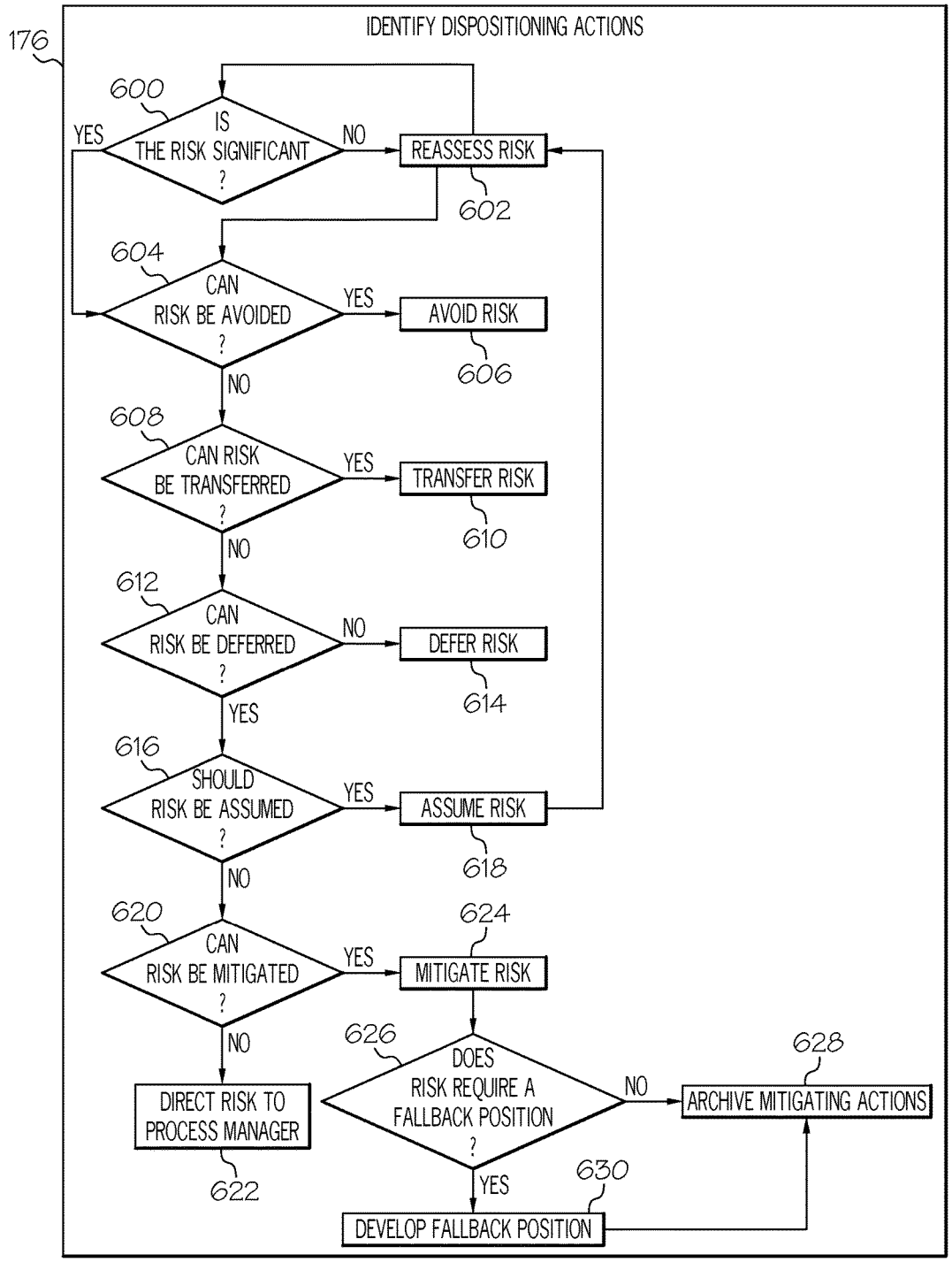
FIG. 18 is a flow diagram of one embodiment of the identifying the dispositioning actions of the disclosed method.
Figure 19:
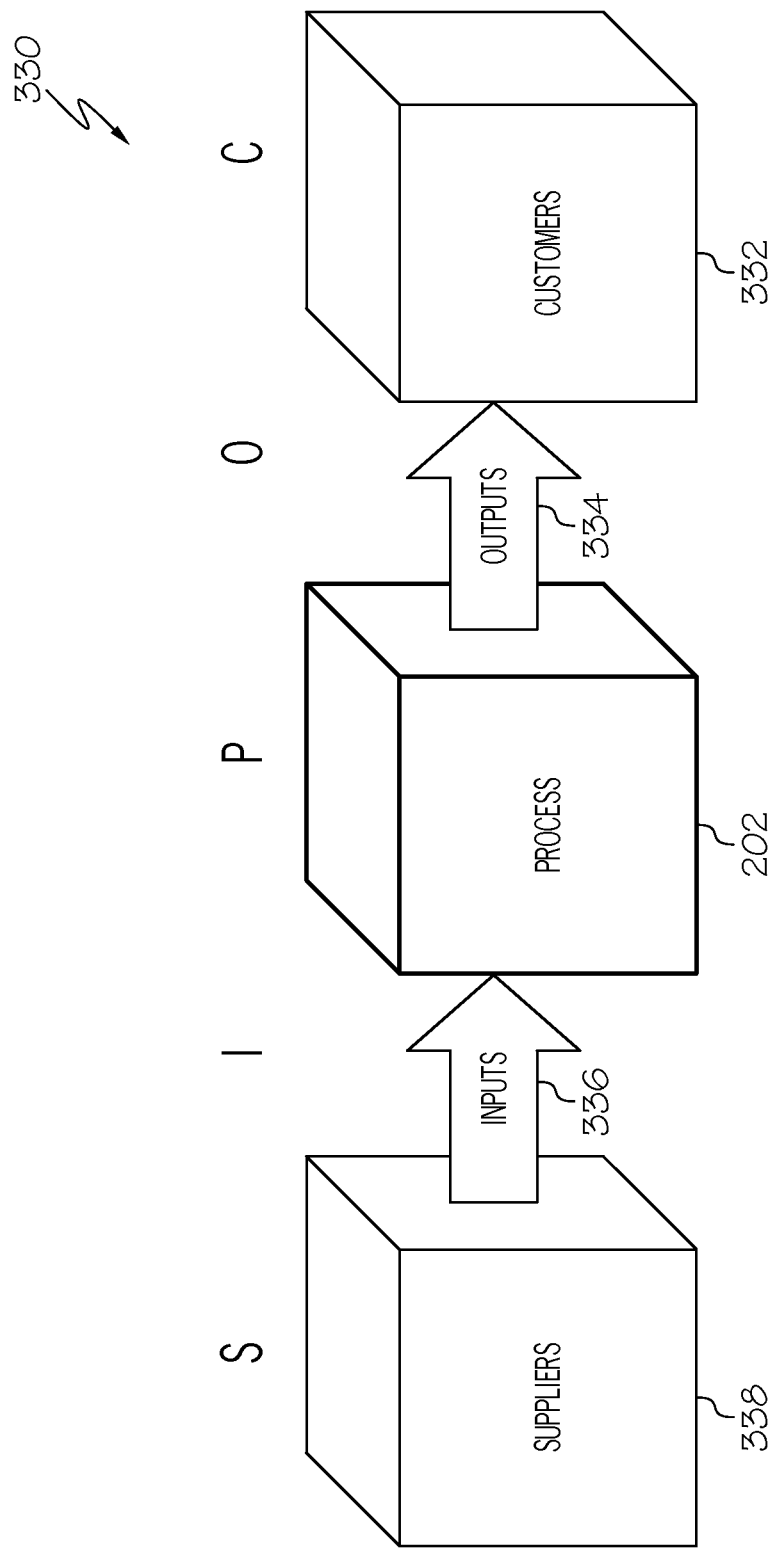
FIG. 19 is a flow diagram illustrating a Supplier-Input-Process-Output-Customer ("SIPOC") relationship.

Examples of the present disclosure may be described in the context of aircraft manufacturing and service method 1100 as shown in FIG. 18 and aircraft 1200 as shown in FIG. 19. During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 19, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive and marine industries.

The apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus and methods, or combination thereof may be utilized during production stages (blocks 1108 and 1110), for example, by substantially reducing the risks associated with aircraft manufacturing and service processes. Similarly, one or more examples of the apparatus and methods, or a combination thereof, may be utilized, for example and without limitation, while aircraft 1200 is in service (block 1112) and during maintenance and service stage (block 1114).

Although various embodiments of the disclosed method have been shown and described, modifications may occur to those skilled in the art upon reading the specification. The present application includes such modifications and is limited only by the scope of the claims.

What is claimed is:

1. A method for process-based analysis of risk in a process implemented in a computer, said method comprising:
    generating a model of the process from process data stored in a database;
    extracting a set of steps required to execute the process from the model using a process definition application of a process-based analysis software tool executed in the computer, communicatively coupled with the database over a network;
    generating a step map comprising a first graphical display of an execution flow of the process, using the process definition application of the process-based analysis software tool;
    generating a second graphical display of risk exposure for the process, using a risk identification application of the process-based analysis software tool, that prompts user input of a set of risks associated with the process, wherein at least one risk of the set of risks is associated with each step of the set of steps, and wherein user input of each risk of the set of risks comprises an identification of the at least one risk associated with each step,
        an event that affects an associated input supplied to each step, and
        an issue that affects an associated output generated by each step;
    automatically assigning attributes to each risk of the set of risks on the second graphical display of risk exposure, using the risk identification application of the process-based analysis software tool, wherein the attributes comprise:
        a severity of the issue associated with each risk;
        a probability of an occurrence of the event associated with each risk; and
        a probability of detection of the event associated with each risk;
    automatically assigning attribute categories to at least one of the attributes associated with each risk on the second graphical display of risk exposure, using the risk identification application of the process-based software analysis tool, wherein the attribute categories comprise:
        a technical impact;
        a schedule impact; and
        a cost impact;
    quantifying the attributes with user input of an attribute score, based on a predefined quantification scale, using a risk assessment application of the process-based analysis software tool;
    quantifying the attribute categories with user input of an attribute category score, based on the predefined quantification scale, using the risk assessment application of the process-based analysis software tool;
    automatically quantifying a business impact measurement of each risk of the set of risks with a business impact measurement score, using the risk assessment application of the process-based analysis software tool, wherein the business impact measurement score comprises a combination of the attribute score of at least one of the attributes and the attribute category score of at least one of the attribute categories; and
    automatically prioritizing the set of risks based on the business impact measurement score of each risk, using a prioritization application of the process-based analysis software tool.

2. The method of claim 1 wherein prioritizing the set of risks comprises ranking the set of risks based on the business impact measurement score of each risk.

3. The method of claim 1 wherein:
    the attribute score and the attribute category score are a numerical value; and
    prioritizing the set of risks comprises:
        comparing the business impact measurement score of each risk to a predefined business impact measurement threshold value;
        determining whether the business impact measurement score has a numerical value greater than the business impact measurement threshold value; and
        indicating each risk of the set of risks having the business impact measurement score with the attribute score numerical value greater than the business impact measurement threshold value.

4. The method of claim 1 wherein:
    quantifying the attributes with the attribute score comprises:
    assigning the probability of the occurrence for each risk with a numerical occurrence score that characterizes the probability of the occurrence of the event associated with each risk based on a predefined occurrence quantification scale; and
    assigning the probability of detection for each risk with a numerical detection score that characterizes the probability of detection of the event associated with each risk based on a predefined detection quantification scale; and
    quantifying the attribute categories with the attribute category score comprises:
    assigning a technical severity for each risk with a numerical technical severity score that characterizes an impact of a technical issue associated with each risk based on a predefined technical severity quantification scale;
    assigning a schedule severity for each risk with a numerical schedule severity score that characterizes an impact of a schedule issue associated with each risk based on a predefined technical severity quantification scale; and assigning a cost severity score for each risk with a numerical cost severity score that characterizes an impact of a cost issue associated with each risk based on a predefined technical severity quantification scale.

5. The method of claim 4 wherein the business impact measurement score comprises a product of the occurrence score, the detection score, and at least one of the technical severity score, the schedule severity score, and the cost severity score.

6. The method of claim 5 further comprising automatically quantifying a total business impact measurement for the process by summing the business impact measurement score of each risk of the set of risks using the process-bases analysis tool.

7. The method of claim 1 further comprising identifying a dispositioning action using the process-based analysis tool, wherein the dispositioning action is directed to one of:
   avoiding the prioritized risks;
   transferring the prioritized risks;
   deferring the prioritized risks;
   assuming the prioritized risks; or mitigating the prioritized risks.

8. The method of claim 7 further comprising assigning ownership of the dispositioning action using the process-based analysis tool.

9. The method of claim 1 further comprising recommending a mitigating action directed to mitigating at least one of the attributes of the prioritized risks using the process-based analysis tool.

10. The method of claim 9 further comprising evaluating the mitigating action by the process-based analysis tool.

11. The method of claim 10 wherein evaluating the mitigating action comprises:
   quantifying the attributes with a mitigated attribute score;
   quantifying the attribute categories with a mitigated attribute category score;
   quantifying the business impact measurement of each risk with a mitigated business impact measurement score; and
   comparing the mitigated business impact measurement score to a predefined business impact measurement threshold.

12. The method of claim 11 wherein:
   quantifying the attributes with the mitigated attribute score comprises:
      assigning the probability of the occurrence for each risk with a numerical mitigated occurrence score that characterizes a mitigated probability of the occurrence of the event associated with each risk based on a predefined occurrence quantification scale; and
      assigning the probability of detection for with a numerical mitigated detection score that characterizes a mitigated probability of detection of the event associated with each risk; and
   quantifying the attribute categories with the attribute category score comprises:
      assigning a technical severity for each risk with a numerical mitigated technical severity score that characterizes a mitigated impact of a technical issue associated with each risk based on a predefined technical severity quantification scale;
      assigning a schedule severity for each risk with a mitigated numerical schedule severity score that characterizes a mitigated impact of a schedule issue associated with each risk based on a predefined technical severity quantification scale; and
      assigning a cost severity score for each risk with a mitigated numerical cost severity score that characterizes a mitigated impact of a cost issue associated with each risk based on a predefined technical severity quantification scale.

13. The method of claim 1 wherein the model of the process comprises at least one symbiotic essential of the process, and wherein the symbiotic essential comprises at least one of an output of the process, a customer for the output of the process, and a supplier of the input of each step of the process.

14. The method of claim 1 wherein prioritizing the risks comprises ranking the set of risks based on an average of the attribute score of the attributes and the attribute category score of one of the attribute categories.

15. The method of claim 1 wherein prioritizing the risks comprises ranking the set of risks based on an average of the attribute score of all of the attributes and the attribute category score of all of the attribute categories.

16. The method of claim 1 further comprising storing the inputs supplied to each step of the set of steps and the outputs generated by each step of the set of steps using a database communicatively coupled with the data processing system.

17. The method of claim 1 wherein the step map of the process comprises at least one input associated with each step of the set of steps and at least one output associated with each step of the set of steps; and the method further comprises organizing each step of the set of steps as the execution flow from a start of the process to an end of the process chronologically or procedurally based on the inputs and the outputs associated with each step of the set of steps using by the process-based analysis software tool.

18. The method of claim 1 further comprising generating a graphical representation of prioritized risks for disposition, using the process-based analysis software tool.

19. An apparatus for process-based analysis of risk in a process, said apparatus comprising:
   at least one processor; and
   a non-transitory computer-readable storage medium that stores executable instructions in the form of a process-based analysis software tool that, when executed by the processor, facilitate performance of operations comprising:
      generating a model of the process from process data stored in a database, the process data comprising a set of steps, inputs supplied to each step of the set of steps and outputs generated by each step of the set of steps;
      extracting the set of steps required to execute the process from the model;
      generating a step map comprising a first graphical display of an execution flow of the process from a start of the process to an end of the process chronologically or procedurally based on the inputs and the outputs associated with each step of the set of steps;
      generating a second graphical display of risk exposure for the process that prompts user input of a set of risks associated with the process, wherein at least one risk of the set of risks is associated with each step of the set of steps, and wherein user input of each risk of the set of risks comprises an identification of the at least one risk associated with each step, an event that affects an associated one of the inputs, and an issue that affects an associated one of the outputs; and automatically assigning attributes to each risk of the set of risks on the second graphical display of risk exposure, wherein the attributes comprise:
  a severity of the issue associated with each risk;
  a probability of an occurrence of the event associated with each risk; and
  a probability of detection of the event associated with each risk;

automatically assigning attribute categories to at least one of the attributes associated with each risk on the second graphical display of risk exposure, wherein the attribute categories comprise:
  a technical impact;
  a schedule impact; and
  a cost impact;

automatically quantifying the attributes with user input of an attribute score, based on a predefined quantification scale;

automatically quantifying the attribute categories with user input of an attribute category score, based on the predefined quantification scale;

automatically quantifying a business impact measurement of each risk of the set of risks with a business impact measurement score, the business impact measurement score comprising a combination of the attribute score of at least one of the attributes and the attribute category score of at least one of the attribute categories;

automatically prioritizing the set of risks based on the business impact measurement score of each risk; and generating a graphical representation of prioritized risks for disposition.

20. The apparatus of claim 19 wherein the operations further comprise:
  assigning the probability of the occurrence of the event associated with each risk with a numerical occurrence score that characterizes the probability of the occurrence of the event associated with each risk based on a predefined occurrence quantification scale;
  assigning the probability of detection of the event associated with each risk with a numerical detection score that characterizes the probability of detection of the event associated with each risk based on a predefined detection quantification scale;
  assigning a technical severity for each risk with a numerical technical severity score that characterizes an impact of a technical issue associated with each risk based on a predefined technical severity quantification scale;
  assigning a schedule severity for each risk with a numerical schedule severity score that characterizes an impact of a schedule issue associated with each risk based on a predefined technical severity quantification scale; and
  assigning a cost severity score for each risk with a numerical cost severity score that characterizes an impact of a cost issue associated with each risk based on a predefined technical severity quantification scale,
  wherein the business impact measurement score comprises a product of the occurrence score, the detection score, and at least one of the technical severity score, the schedule severity score, and the cost severity score.

21. The apparatus of claim 20 wherein the operations further comprise:
  comparing the business impact measurement score of each risk to a predefined business impact measurement threshold value;
  determining whether the business impact measurement score is greater than the business impact measurement threshold value; and
  indicating each risk of the set of risks having the business impact measurement score greater than the business impact measurement threshold value.

22. The apparatus of claim 19 wherein the operations further comprise identifying a dispositioning action directed to at least one of avoiding, transferring, deferring, assuming or mitigating the prioritized risks.

23. A non-transitory computer-readable storage medium used for controlling a computer and comprising instructions in the form of a process-based analysis software tool for process-based analysis of risk in a process, that when executed by the computer, perform operations comprising:
  extracting a set of steps required to execute the process from a model of the process generated from process data stored in a database, using process definition application of the process-based analysis software tool, wherein the process data comprises a set of steps, inputs supplied to each step of the set of steps, and outputs generated by each step of the set of steps;
  generating a step map comprising a first graphical display of an execution flow of the process from a start of the process to an end of the process chronologically or procedurally based on the inputs and the outputs associated with each step of the set of steps using the process definition application of the process-based analysis software tool;
  generating a second graphical display of risk exposure for the process, using a risk identification application of the process-based analysis software tool, that prompts user input of a set of risks associated the process, wherein at least one risk of the set of risks is associated with each step of the set of steps, and wherein each risk of the set of risks comprises an identification of the at least one risk associated with each step, an event that affects an associated one of the inputs, and an issue that affects an associated one of the outputs;
  automatically assigning attributes to each risk of the set of risks on the second graphical display of risk exposure, using the risk identification application of the process-based analysis software tool, wherein the attributes comprise:
    a severity of the issue associated with each risk;
    a probability of an occurrence of the event associated with each risk; and
    a probability of detection of the event associated with each risk;
  automatically assign attribute categories to at least one of the attributes associated with each risk on the second graphical display of risk exposure, using the risk identification application of the process-based analysis software tool, wherein the attribute categories comprise:
    a technical impact;
    a schedule impact; and
    a cost impact;
  automatically quantifying the attributes with user input of an attribute score, based on a predefined quantification scale, using a risk assessment application of the process-based analysis software tool;
  automatically quantifying the attribute categories with user input of an attribute category score, based on the predefined quantification scale, using the risk assessment application of the process-based analysis software tool;

automatically quantifying a business impact measurement of each risk of the set of risks with a business impact measurement score, using the risk assessment application of the process-based analysis software tool, wherein the business impact measurement score comprises a combination of the attribute score of at least one of the attributes and the attribute category score of at least one of the attribute categories;

automatically prioritizing the set of risks based on the business impact measurement score of each risk, using a prioritization application of the process-based analysis software tool; and generating a graphical representation of prioritized risks for disposition, using the prioritization application of the process-based analysis software tool.

24. The non-transitory computer-readable storage medium of claim 23 wherein the operations further comprise:

assigning the probability of the occurrence of the event associated with each risk with a numerical occurrence score that characterizes the probability of the occurrence of the event associated with each risk based on a predefined occurrence quantification scale;

assigning the probability of detection of the event associated with each risk with a numerical detection score that characterizes the probability of detection of the event associated with each risk based on a predefined detection quantification scale;

assigning a technical severity for each risk with a numerical technical severity score that characterizes an impact of a technical issue associated with each risk based on a predefined technical severity quantification scale;

assigning a schedule severity for each risk with a numerical schedule severity score that characterizes an impact of a schedule issue associated with each risk based on a predefined technical severity quantification scale; and assigning a cost severity score for each risk with a numerical cost severity score that characterizes an impact of a cost issue associated with each risk based on a predefined technical severity quantification scale, wherein the business impact measurement score comprising a product of the occurrence score, the detection score, and at least one of the technical severity score, the schedule severity score, and the cost severity score.

25. The non-transitory computer-readable storage medium of claim 24 wherein the operations further comprise:

comparing the business impact measurement score of each risk to a predefined business impact measurement threshold;

determining whether the business impact measurement score is greater than the business impact measurement threshold value; and indicating each risk of the set of risks having the business impact measurement score greater than the business impact measurement threshold.

26. The non-transitory computer-readable storage medium of claim 24, wherein the operations further comprise:

identifying a dispositioning action directed to at least one of avoiding, transferring, deferring, assuming or mitigating the prioritized risks; and evaluating the dispositioning action directed to mitigating the prioritized risk.

27. The non-transitory computer-readable storage medium of claim 26 wherein the operations further comprise:

quantifying the attributes with a mitigated attribute score;

quantifying the attribute categories with a mitigated attribute category score;

quantifying the business impact measurement with a mitigated business impact measurement score; and comparing the mitigated business impact measurement score to a predefined business impact measurement threshold.

* * * * *